US007399003B2

(12) United States Patent
Kobayashi et al.

(10) Patent No.: US 7,399,003 B2
(45) Date of Patent: Jul. 15, 2008

(54) DUCT CONNECTING STRUCTURE

(75) Inventors: Atsushi Kobayashi, Nagano-ken (JP); Toshio Kumagai, Nagano-ken (JP); Yoshiharu Aruga, Nagano-ken (JP); Izumi Nozawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 309 days.

(21) Appl. No.: 11/100,630

(22) Filed: Apr. 7, 2005

(65) Prior Publication Data

US 2005/0275671 A1 Dec. 15, 2005

(30) Foreign Application Priority Data

Apr. 8, 2004 (JP) ............................. 2004-114549
Sep. 21, 2004 (JP) ............................. 2004-274094
Mar. 24, 2005 (JP) ............................. 2005-087020

(51) Int. Cl.
*F16L 39/00* (2006.01)

(52) U.S. Cl. ........................ 285/124.1; 285/68; 285/69; 285/124.3; 347/65; 347/85

(58) Field of Classification Search ............. 285/68–69, 285/124.1, 124.3, 124.4, 124.5, 66; 347/65, 347/84–85
See application file for complete search history.

(56) References Cited

U.S. PATENT DOCUMENTS

| | | | | |
|---|---|---|---|---|
| 4,356,499 | A * | 10/1982 | Kodama | 347/40 |
| 5,929,883 | A * | 7/1999 | Gunther et al. | 347/85 |
| 6,007,190 | A * | 12/1999 | Murray et al. | 347/86 |
| 6,443,498 | B1 * | 9/2002 | Liao | 285/124.1 |
| 2005/0083382 | A1 * | 4/2005 | Shiho et al. | 347/85 |

FOREIGN PATENT DOCUMENTS

JP 2001-212974 A 8/2001

* cited by examiner

*Primary Examiner*—Aaron Dunwoody
*Assistant Examiner*—Fannie Kee
(74) *Attorney, Agent, or Firm*—Sughrue Mion, PLLC

(57) ABSTRACT

A plurality of cylindrical port defining portions project from a passage defining member defining a plurality of passages. A supply line defining body defining a plurality of supply lines is formed of an elastic member. The supply line defining body includes a plurality of openings each communicating with a corresponding one of the liquid supply lines. Each of the port defining portions extends perpendicularly to the direction in which each of the passages extends. Each of the openings extends perpendicular to the direction in which each of the liquid supply lines extends. A securing member fastens the port defining portions with respect to the corresponding openings collectively, by applying fastening force to the passage defining member and the supply line defining body in the axial direction of each port defining portion.

7 Claims, 12 Drawing Sheets

DUCT CONNECTING STRUCTURE

BACKGROUND OF THE INVENTION

The present invention relates to duct connecting structures.

Conventionally, inkjet recording devices are broadly known as a type of liquid ejection device. The inkjet recording devices include so-called off-carriage types in which an ink retaining body provided in an ink cartridge is connected to a recording head provided along the bottom surface of a carriage through an ink supply tube. This type of recording device pressurizes the ink retaining body by supplying pressurized air into the ink cartridge with a pressurization pump or the like. As pressurized, the ink retaining body presses and moves the ink retained in the ink retaining body to flow to the recording head through the ink supply tube, which is formed of polyethylene or the like. The recording head is thus supplied with ink. The ink is ejected toward a recording paper sheet as ink drops, through a nozzle opening of the recording head provided in the carriage, which reciprocates, thus performing recording (see, for example, Japanese Laid-Open Patent Publication No. 2001-212974).

There is a demand for minimization of ink jet type recording devices as a whole. For meeting the demand, the ink supply tube is formed of flexible material such as elastomer. When the carriage is reciprocated, the ink supply tube is bent by a large amount for saving the space for moving the tube. When joining the ink supply tube with a connecting member connected to the ink retaining body, a sleeve projecting from the connecting member is fitted into a hole defined in the tube. This structure prevents separation between the ink supply tube and the connecting member. Further, since the ink supply tube is formed of elastomer, the tube is relatively soft and thus functions as a seal.

However, such softness makes it easier for the ink supply tube of elastomer to be deformed due to creep or by external force. The deformation of the ink supply tube produces a gap between the sleeve and the connecting hole, resulting in lowering of the seal performance between the ink supply tube and the connecting member.

SUMMARY OF THE INVENTION

Accordingly, it is an objective of the present invention to provide a duct connecting structure that reliably provides improved seal performance.

To achieve the foregoing objective of the present invention, the invention provides a structure for joining a passage defining member defining a plurality of passages with a supply line defining body defining a plurality of liquid supply lines. The supply line defining body is formed of an elastic member. A plurality of port defining portions project from the passage defining member. Each of the port defining portions includes a port communicating with a corresponding one of the passages. The supply line defining body includes a plurality of openings each communicating with a corresponding one of the liquid supply lines. The passage defining member is joined with the supply line defining body by fitting each of the port defining portions into an associated one of the openings, thus allowing the passages to communicate with the liquid supply lines. At least one securing member, provided in the quantity smaller than the quantity of the port defining portions or the openings, firmly fastens the port defining portions with respect to the corresponding openings, collectively.

Another aspect of the present invention is a structure for joining a passage defining member defining a plurality of passages with a supply line defining body defining a plurality of liquid supply lines. The supply line defining body is formed of an elastic member. A plurality of cylindrical port defining portions project from the passage defining member. Each of the port defining portions includes a port communicating with a corresponding one of the passages. The supply line defining body includes a plurality of openings each communicating with a corresponding one of the liquid supply lines. The passage defining member is joined with the supply line defining body by fitting each of the port defining portions into an associated one of the openings, thus allowing the passages to communicate with the liquid supply lines. Each of the port defining portions extends perpendicularly to the direction in which each of the passages extends. Each of the openings is defined in a columnar shape and extends perpendicular to the direction in which each of the liquid supply lines extends. A securing member fastens the port defining portions with respect to the corresponding openings collectively, by applying fastening force to the passage defining member and the supply line defining body in the axial direction of each port defining portion.

BRIEF DESCRIPTION OF THE DRAWINGS

The characteristics of the present invention that are believed to be novel will be made clear by the attached claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 1:
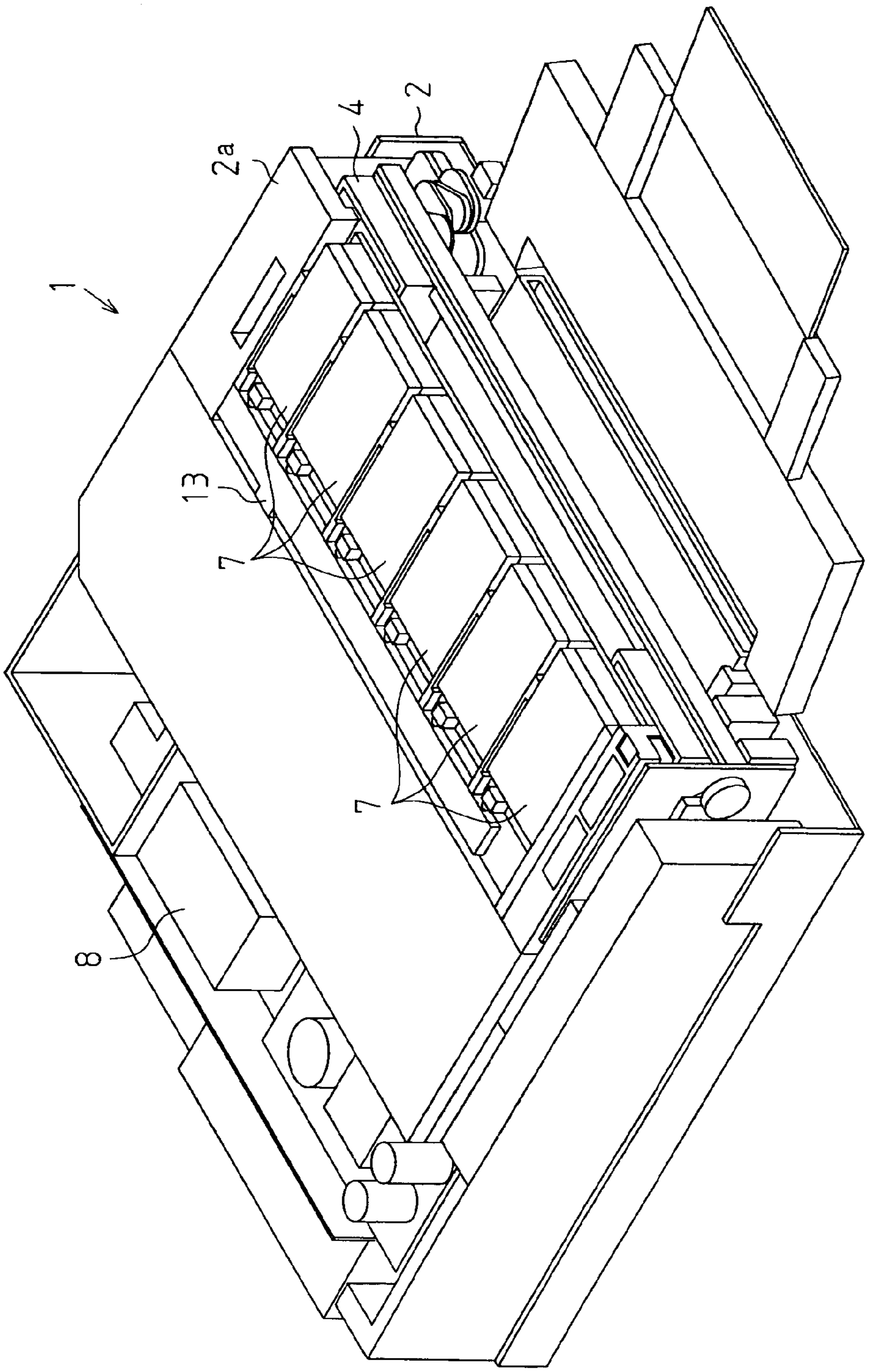
FIG. 1 is a perspective view showing an operating portion of an example of an inkjet recording device according to a first embodiment of the present invention.
Figure 2:
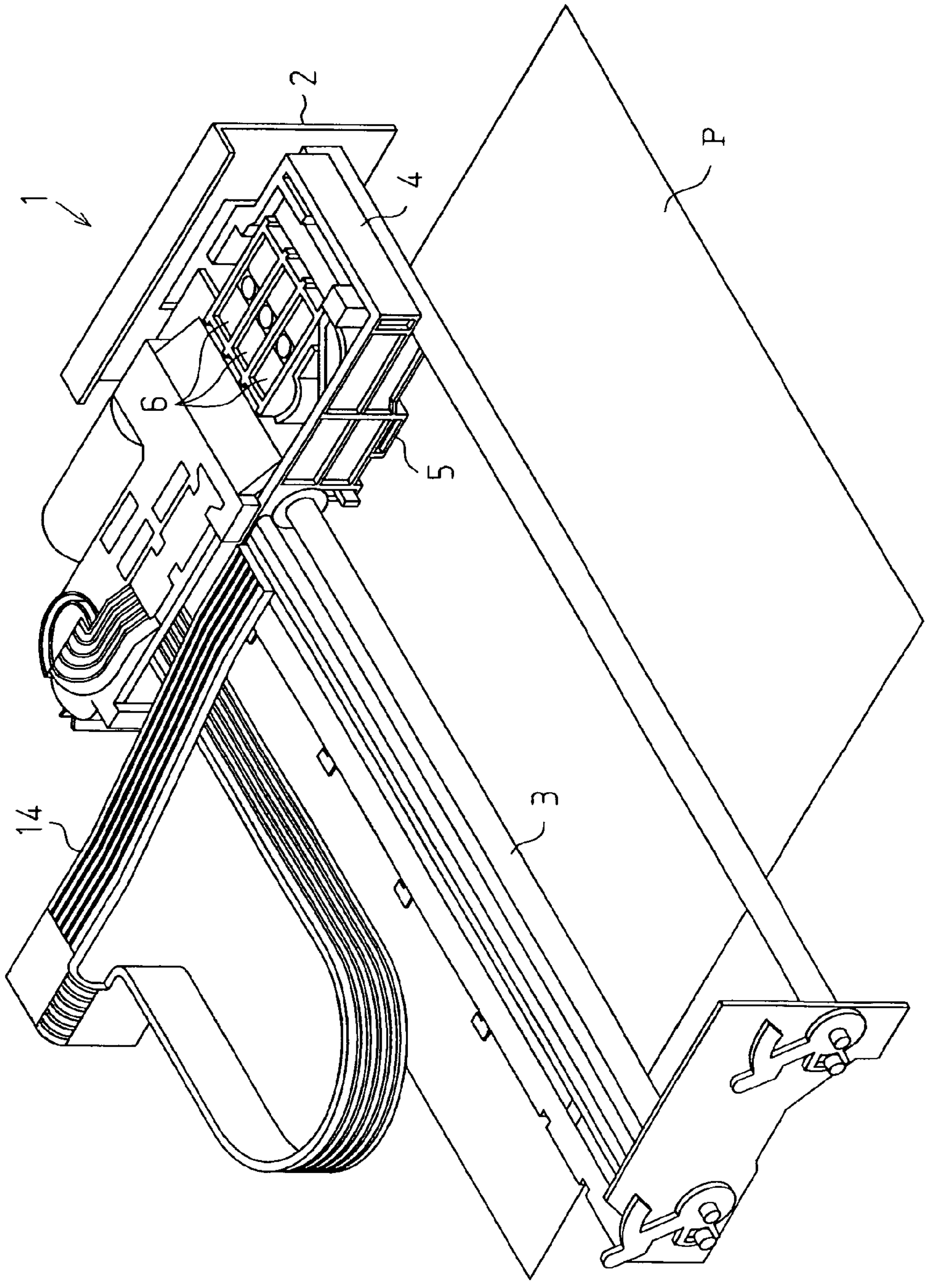
FIG. 2 is a perspective view showing the mechanism of a main portion of the inkjet recording device of FIG. 1.
Figure 3:
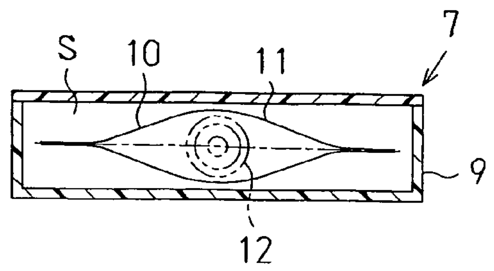
FIG. 3 is a cross-sectional view for explaining the structure of the ink cartridge of FIG. 1.

A first embodiment of the present invention will now be described with reference to FIGS. 1 to 7. FIG. 1 is a perspective view showing an inkjet type recording device as a liquid ejection device according to the first embodiment (hereinafter, referred to as a printer 1). FIG. 2 is a perspective view showing the main portion of the printer 1. FIG. 3 is a cross-sectional view showing ink cartridges 7 of the printer 1.

As shown in FIGS. 1 and 2, the printer 1 is an inkjet type and includes a frame 2. The printer 1 includes a guide member 3, a carriage 4, a recording head 5 serving as a liquid ejection head, valve units 6, the ink cartridges 7 each serving as a liquid retaining portion, and an air-pressurization pump 8, which are received in the frame 2. A cartridge holder 2*a* is formed on a front surface of the printer 1.

Referring to FIG. 2, the guide member 3 is formed in a rod-like shape and extends in the space defined by the frame 2. In the first embodiment, the extending direction of the guide member 3 is defined as a main scanning direction. The carriage 4 is secured to the guide member 3 in such a manner that the carriage 4 is movable relative to the guide member 3. The carriage 4 reciprocates in the main scanning direction. The carriage 4 is connected to a carriage motor (not shown) through a timing belt (not shown). The carriage motor is supported by the frame 2. When the carriage motor is driven, the carriage 4 is operated through the timing belt to reciprocate along the guide member 3, or, in the main scanning direction.

The recording head 5 is formed along the bottom surface of the carriage 4 and includes a plurality of nozzles (not shown) for ejecting ink as liquid. The valve units 6 are mounted on the carriage 4 and temporarily retain ink. The ink is then supplied to the recording head 5 in a pressure-adjusted state.

In the first embodiment, each of the valve units 6 corresponds to two types of ink and is allowed to feed the respective types of ink independently to the recording head 5 in the pressure-adjusted state. Further, this embodiment includes three valve units 6, which correspond to six colors (black, yellow, magenta, cyan, light magenta, and light cyan) of ink.

A platen (not shown) is also provided below the recording head 5 and supports a recording medium P, which is moved by a paper feeder mechanism (not shown) in a sub scanning direction perpendicular to the main scanning direction.

As shown in FIG. 1, the ink cartridges 7 are separably received in a cartridge holder 2*a*. The ink cartridges 7 are provided in the quantity corresponding to that of the aforementioned colors of ink, six.

Referring to FIG. 3, each of the ink cartridges 7 includes an ink pack 10 received in a cartridge casing 9. The ink pack 10 has a bag portion 11 for retaining ink and an outlet portion 12. The ink is sealed in the bag portion 11 and is sent from the outlet portion 12. The ink pack 10 is set in the cartridge casing 9 with a part of the outlet portion 12 exposed from the cartridge casing 9. The remainder of the ink pack 10 is sealed air-tightly in the cartridge casing 9. The cartridge casing 9 has a non-illustrated air inlet port that is communicating with the space S defined between the cartridge casing 9 and the ink pack 10. This structure makes it possible to raise the pressure in the space S by introducing the air from the air inlet port, thus generating the force acting to squeeze the ink pack 10.

The outlet portion 12 of each of the ink packs 10 is connected to the ink supply tube 14 (see FIG. 2) serving as a supply line defining body through the connecting member 13 (see FIG. 1) serving as a passage defining member. As shown in FIG. 2, the ink supply tube 14 is connected to the valve units 6. As aforementioned, the valve units 6 are connected to the recording head 5. This arrangement allows the ink in each ink pack 10 to flow to the corresponding valve unit 6 through the ink supply tube 14.

As shown in FIG. 1, the air-pressurization pump 8 is secured to the backside of the frame 2. The air-pressurization pump 8 draws the atmospheric air and releases the air as pressurized air. Further, the air-pressurization pump 8 is connected to the air inlet port of each ink cartridge 7 through a corresponding one of non-illustrated six air tubes. In this manner, the air pressurized by the air-pressurization pump 8 is sent to the space S of the ink cartridge 7 through the air tube.

Therefore, for example, if the pressurized air is sent from the air-pressurization pump 8 to the space S and the ink pack 10 of each ink cartridge 7 is pressurized, the ink of the ink pack is supplied to the corresponding valve unit 6. The ink is temporarily retained in the valve unit 6 and then fed to the recording head 5 in the pressure-adjusted state. The printer 1 then operates the carriage 4 in the main scanning direction while moving the recording medium P by means of the paper feeder mechanism and ejects ink from the recording head 5, in accordance with image data. In this manner, the recording medium P is subjected to printing.

Next, the joint structure (duct connecting structure) between the connecting member 13 and the ink supply tube 14 will be explained with reference to FIGS. 4 to 7.

Figure 4:
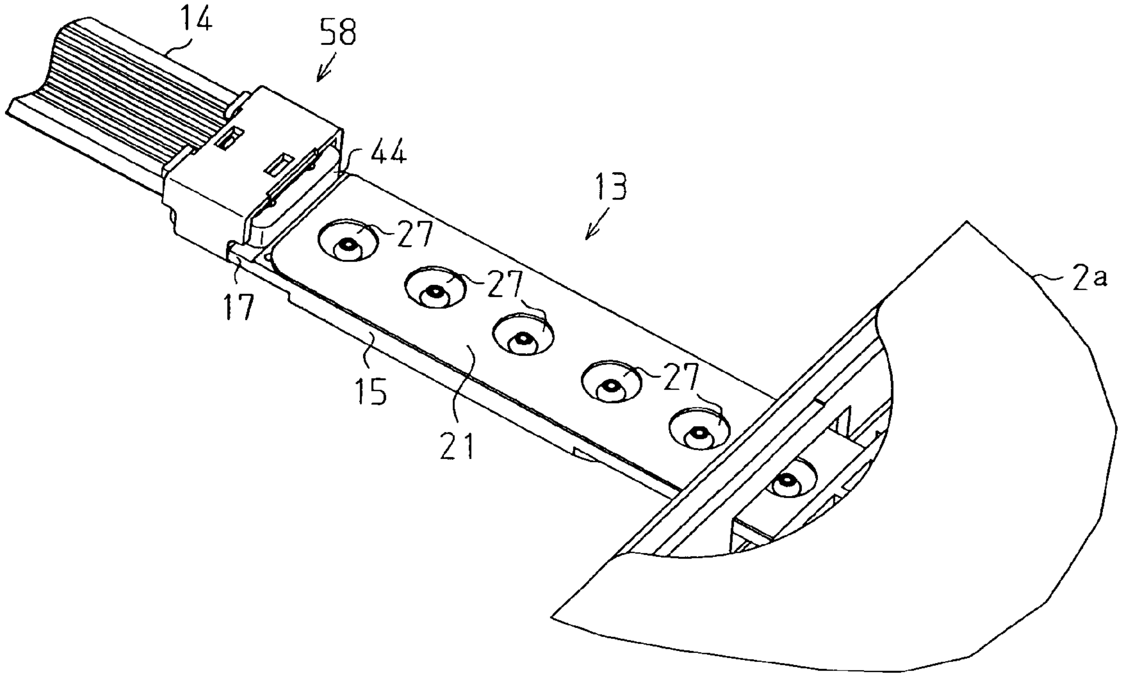
FIG. 4 is a perspective view for explaining the structure of a securing member of the device of FIG. 1.

As shown in FIG. 4, the connecting member 13 is connected to the cartridge holder 2*a* and supplies the ink from the outlet portion 12 (see FIG. 3) of each ink pack 10 (see FIG. 3), which corresponds to one of the colors of ink, to the ink supply tube 14. The connecting member 13 has a substantially rectangular shape and is formed of, for example, polypropylene.

Figure 5:
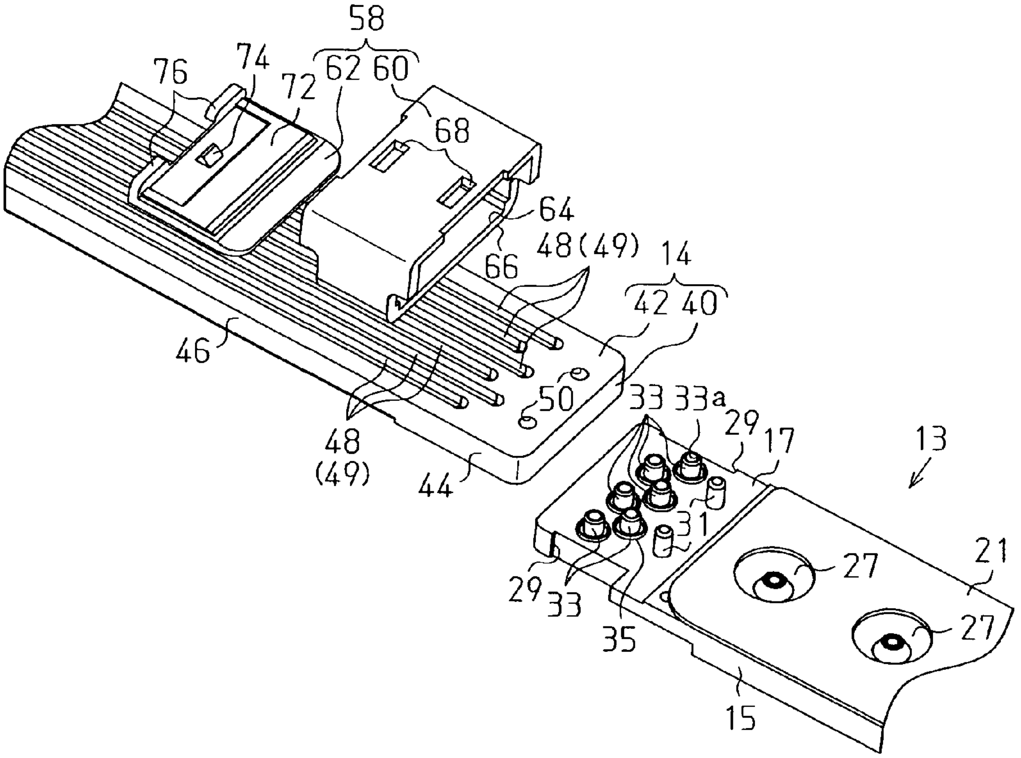
FIG. 5 is an exploded perspective view for explaining the structure of the securing member of FIG. 4.
Figure 6:
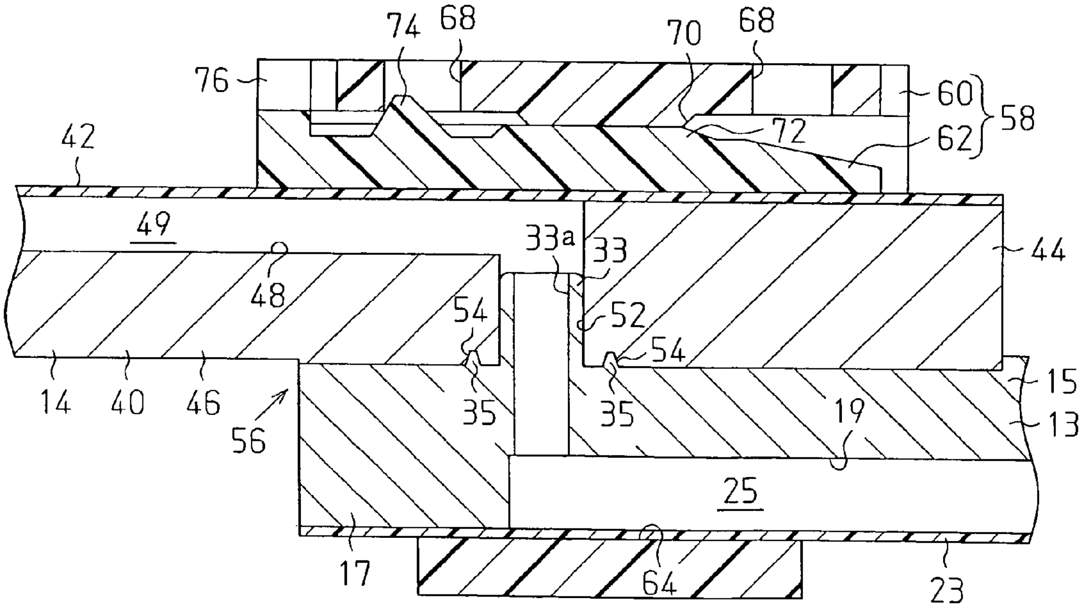
FIG. 6 is a cross-sectional view for explaining the structure of the securing member of FIG. 4.

Referring to FIG. 5, the connecting member 13 includes an ink outlet portion 15 and a connecting portion 17, which are arranged in this order from the side corresponding to the cartridge holder 2*a* (see FIG. 4). As shown in FIG. 6, six groove portions 19 are defined in the bottom surface of the connecting member 13 in correspondence with the six ink colors, extending longitudinally and parallel with one another as spaced at equal intervals. Each of the groove portions 19 is connected to the outlet portion 12 (see FIG. 3) of the corresponding ink pack 10 (see FIG. 3), as well as the connecting portion 17. The length of each groove portion 19 is slightly smaller than the longitudinal dimension of the connecting member 13.

With reference to FIG. 5, the upper surface of the ink outlet portion 15 is covered by a lid 21 formed of, for example, polypropylene. As shown in FIG. 6, a film member 23 is welded to the bottom surface of the connecting member 13. The film member 23 is formed by vapor-depositing a gas barrier layer including a plurality of layers formed of, for example, nylon or aluminum on a resin layer including a plurality of thermoplastic resin layers formed of, for example, polypropylene or polyethylene. The groove portions 19 are sealed by the film member 23 for defining ink passages 25, each of which serves as a passage formed by the passage defining member. Referring to FIG. 5, a valve device 27 is formed in each of the ink passages 25 and extends through the ink outlet portion 15 and the lid 21. Each of the valve devices 27 prevents ink leakage when the ink supply tube 14 is removed from the connecting member 13 or when the orientation of the printer 1 changes.

The connecting portion 17 of the connecting member 13 is formed at an end of the ink outlet portion 15 corresponding to the ink supply tube 14. As shown in FIG. 5, a pair of left and right engagement recesses 29 are defined in opposing side surfaces (a first side surface 17*a* and a second side surface 17*b*) of the connecting portion 17. A pair of left and right engagement projections 31 project from the upper surface of the connecting portion 17 at the side corresponding to the ink outlet portion 15. Further, ink outlet port defining portions 33, each of which serves as a cylindrical port defining portion corresponding to one of the six ink colors, project from the upper surface of the connecting portion 17 at the side corresponding to the ink supply tube 14 (the side opposite to the ink outlet portion 15) with respect to the engagement projections 31, as viewed in FIG. 5. Referring to FIG. 6, a port 33*a* is defined in each of the port defining portions 33 and communicating with the corresponding one of the ink passages 25 associated with the six ink colors. The ink from the outlet portion 12 (see FIG. 3) of each ink pack 10 (see FIG. 3) is thus introduced from the connecting member 13 through the corresponding port defining portion 33. The port defining portions 33 are arranged at alternating positions as viewed along the longitudinal direction of the connecting member 13. This arrangement shortens the lateral dimension of the connecting portion 17 and increases the diameter of each port defining portion 33, as compared to, for example, the case in which the port defining portions 33 are aligned along a single line. Annular engagement projections 35 project from the upper surface of the connecting portion 17 in such a manner as to encompass the corresponding port defining portions 33.

As shown in FIG. 5, the ink-supply tube 14 includes an elastic member 40 and a film member 42. The elastic member 40 is formed of, for example, elastomer. The elastic member 40 has a connecting portion 44 and an ink inlet portion 46 in this order from the side corresponding to the connecting member 13. Also, with reference to FIG. 6, six groove portions 48 are defined in the upper surface of the elastic member 40 in correspondence with the six ink colors, extending longitudinally and parallel with one another as spaced at equal intervals. The length of each groove portion 48 is slightly smaller than the longitudinal dimension of the elastic member 40.

The film member 42 is formed by vapor-depositing a gas barrier layer including a plurality of layers formed of, for example, nylon or aluminum on a resin layer including a plurality of thermoplastic resin layers formed of, for example, polypropylene or polyethylene. The film member 42 and the elastic member 40 are equally sized. The ink supply tube 14 is formed by welding the film member 42 on the upper surface of the elastic member 40. The groove portions 48 are thus sealed by the film member 42 for defining ink supply lines 49 each serving as a liquid supply line.

As shown in FIG. 5, a pair of, left and right engagement holes 50 are defined in the connecting portion 44 of the elastic member 40. Each of the engagement holes 50 is arranged at the position corresponding to one of the engagement projections 31 of the connecting member 13. When joining the connecting member 13 with the ink supply tube 14, each of the engagement projections 31 is inserted into the corresponding engagement hole 50, so that the connecting member 13 can be positioned with respect to the ink supply tube 14.

As illustrated in FIG. 6, openings 52 are defined in the bottom surface of the elastic member 40 at positions opposed to the corresponding port defining portions 33, which are formed in the connecting member 13 (the connecting portion 17). Each of the openings 52 communicates with the corresponding groove portion 48. The opening 52 is encompassed by an annular engagement recess 54. When the connecting member 13 and the ink supply tube 14 are joined together, each of the port defining portions 33 is inserted into the corresponding opening 52. In this state, the engagement projection 35 encompassing each port defining portion 33 is engaged with the corresponding engagement recess 54, which is formed around the opening 52 in the bottom surface of the elastic member 40. In this manner, the connecting member 13 and the ink supply tube 14 are joined together at the connecting portions 17, 44 (hereinafter, as referred to as a joint portion 56) of the connecting member 13 and the ink supply tube 14. That is, the connecting portion 17 of the connecting member 13 and the connecting portion 44 of the ink supply tube 14, which are the two joined portions, together define the joint portion 56. Therefore, the ink from the outlet portion 12 (see FIG. 3) of each ink pack 10 (see FIG. 3) is ejected from the recording head 5 through the corresponding ink passage 25 of the connecting member 13, the port 33*a* of the corresponding port defining portion 33, and the corresponding ink supply line 49.

As shown in FIG. 4, the outer side of the joint portion 56 (the connecting portions 17, 44) are securely joined together by a securing member 58, which forms part of the duct connecting structure. More specifically, referring to FIG. 5, the securing member 58 is formed by a ring 60 serving as a securing frame and a wedge-like portion 62 serving as a stopper member.

Figure 7:
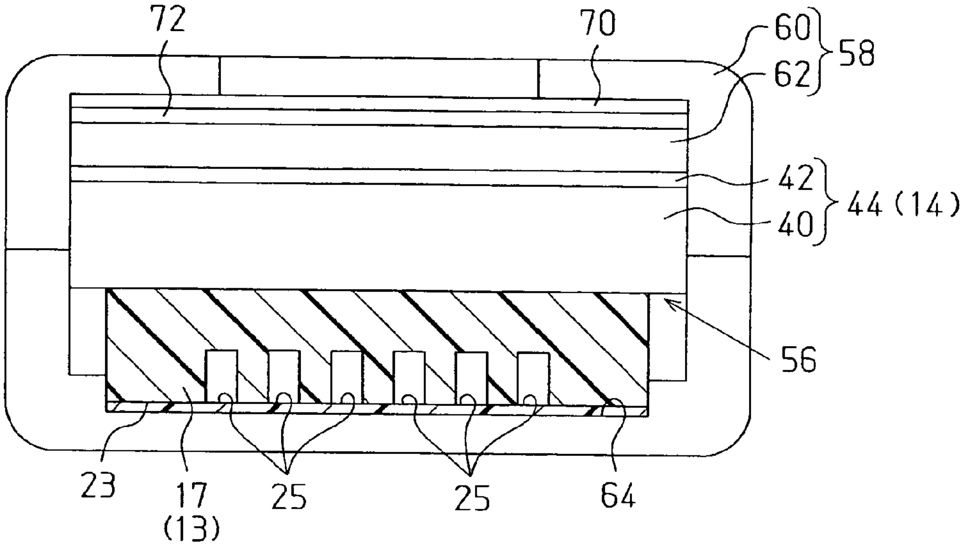
FIG. 7 is a cross-sectional view for explaining the structure of the securing member of FIG. 4.

The ring 60 has a square frame-like shape and is formed of, for example, polypropylene. The ring 60 is shaped through injection molding. The left and right sections of the ring 60 are mirror images in shape for each other and the front and rear sections of the ring 60 are mirror images in shape for each other. The height of the inner wall surface of the ring 60 is slightly larger than the thickness of the joint portion 56 (the total of the thickness of the connecting portion 17 and that of the connecting portion 44), as illustrated in FIG. 7. The width of the inner wall surface of the ring 60 is set in such a manner that the ink supply tube 14 is tightly fastened to this surface. As shown in FIGS. 5 and 7, a recess 64 is defined in the inner bottom surface of the ring 60. The width of the recess 64 is slightly smaller than that of the inner wall surface of the ring 60. That is, the width of the recess 64 is set in such a manner that the engagement recess 29 defined in the connecting portion 17 of the connecting member 13 is firmly fastened to the recess 64. Further, the ring 60 has T-shaped side surfaces. The dimension of a bottom surface 66 of the ring 60 in the longitudinal dimension of the ink supply tube 14 is set in correspondence with the longitudinal dimension of the engagement recess 29 of the connecting portion 17 of the connecting member 13, for ensuring firm fastening between the ring 60 and the engagement recess 29.

As shown in FIGS. 5 and 6, two square engagement holes 68 are defined in the upper surface of the ring 60. Referring to FIGS. 6 and 7, a projection 70 projects from the upper inner wall surface of the ring 60. The longitudinal dimension of the projection 70 is set in such a manner as to avoid interference with the engagement holes 68. The width (the lateral dimension) of the projection 70 is equal to that of the inner wall surface of the ring 60.

With reference to FIG. 5, the wedge-like portion 62 has a substantially square plate-like shape and the longitudinal dimension of the wedge-like portion 62 is slightly longer than that of the ring 60. The wedge-like portion 62 is formed of, for example, polypropylene. As shown in FIG. 6, the wedge-like portion 62 includes a tapered portion tapered toward the distal end of the wedge-like portion 62 (the side corresponding to the connecting member 13). A projection 72 projects from the upper surface of the wedge-like portion 62 at the position opposed to the projection 70 of the ring 60. With reference to FIGS. 6 and 7, the thickness of the projection 72 is set in such a manner that the joint portion 56 and the projection 72 are firmly fastened to each other at the position at which the projection 70 of the ring 60 is formed.

Referring to FIGS. 5 and 6, a projection 74 projects from the upper surface of the wedge-like portion 62 at the position corresponding to the engagement hole 68 of the ring 60 located at the side corresponding to the ink supply tube 14 (and opposite to the tapered portion of the wedge-like portion 62). The height of the projection 74 is substantially as half as the depth of the engagement hole 68. Further, a pair of left and right stoppers 76 are provided on the upper surface of the wedge-like portion 62 at the end of the wedge-like portion 62 corresponding to the ink supply tube 14 (opposite to the tapered portion of the wedge-like portion 62). The height of each of the stoppers 76 is substantially equal to the thickness of the ring 60. As engaged with the ring 60, the stoppers 76 restrict further movement of the wedge-like portion 62 into the space encompassed by the ring 60.

For assembling the securing member 58, which is configured as above-described, the ring 60 is placed at the side corresponding to the ink supply tube 14. Since the left and right sections of the ring 60 are mirror images in shape for each other and the front and rear sections of the ring 60 are mirror images in shape for each other, the orientation of the ring 60 does not have to be considered when placing the ring 60. Subsequently, the engagement projections 31 of the connecting member 13 and the associated engagement holes 50 of the ink supply tube 14 are positioned mutually, so that the port defining portions 33 of the connecting member 13 can be fitted in the corresponding openings 52 of the ink supply tube 14. At this stage, the engagement projections 35 formed around the port defining portions 33 are fitted in the engagement recesses 54 formed around the openings 52. In this manner, the connecting member 13 and the ink supply tube 14 are joined together at the joint portion 56. In this state, the connecting portion 44 of the ink supply tube 14, which is formed of elastomer, functions as a seal member.

Next, as shown in FIGS. 6 and 7, the ring 60 is placed around the joint portion 56. At this stage, the recess 64 of the ring 60 is engaged with the engagement recess 29 of the connecting member 13. This engagement prevents the connecting member 13 from falling and restricts horizontal displacement of the engagement recess 29 of the connecting member 13. The ring 60 is thus allowed to secure the outer circumferences of the connecting member 13 and the ink supply tube 14. Therefore, the connecting member 13 and the ink supply tube 14 are maintained in a state securely joined together if the ink supply tube 14 moves longitudinally, as well as if the ink supply tube 14 moves horizontally or upward. Also, since the ink supply tube 14 is prevented from being raised, the ink supply tube 14 (the elastic member 40) is free from deformation and ink leakage is prevented. Further, the annular shape of the ring 60 makes it possible for the ring 60 to produce a relatively great fastening force regardless of the relatively small thickness of the ring 60.

Next, the wedge-like portion 62 is inserted into a relatively small space defined above the ink supply tube 14 in the space encompassed by the ring 60. Such insertion is facilitated by the tapered shape of the wedge-like portion 62, or the thickness of the wedge-like portion 62 that becomes gradually smaller toward the distal end of the wedge-like portion 62. Further, the projection 72, which projects from the upper surface of the wedge-like portion 62, enables the connecting member 13, the ink supply tube 14, and the wedge-like portion 62 to be firmly fastened together in a gradual manner by means of the projection 70 of the ring 60, thus generating a relatively great fastening force.

The projection 74 of the wedge-like portion 62 is then fitted in the associated engagement hole 68 of the ring 60. This arrangement prevents the ink supply tube 14 from falling from the ring 60. In this state, the stoppers 76 are held in contact with the end of the ring 60 corresponding to the ink supply tube 14 (opposite to the tapered portion of the wedge-like portion 62). Such contact prevents the wedge-like portion 62 from being displaced toward the connecting member 13. The connecting member 13 is thus prevented from falling from the ring 60 due to decrease of the force acting to hole the joint portion 56 in place, which is caused by the displacement of the wedge-like portion 62.

Accordingly, even if the connecting portion 44 of the ink supply tube 14, which is formed of a relatively soft material such as elastomer, is deformed due to creep or by external force, the seal performance between the ink supply tube 14 and the connecting member 13 is maintained by the ring 60 and the wedge-like portion 62.

The first embodiment has the following advantages.

(1) In the first embodiment, the connecting member 13 and the ink supply tube 14 are joined together at the joint portion 56. The outer circumference of the joint portion 56 is firmly secured by the securing member 58. That is, the outer circumferences of the connecting member 13 and the ink supply tube 14 are held in place. The firm joint between the connecting member 13 and the ink supply tube 14 is thus maintained when the ink supply tube 14 moves longitudinally, as well as when the ink supply tube 14 moves horizontally or upward from the connecting member 13. Further, since the securing member 58 securely connects the multiple ink passages 25 to the corresponding ink supply lines 49 collectively, the assembly time is shortened.

(2) In the first embodiment, the ring 60 is placed around the outer circumference of the joint portion 56 between the connecting member 13 and the ink supply tube 14. The wedge-like portion 62 is then inserted (fitted) into the space between the ring 60 and the joint portion 56. The connecting member 13 and the ink supply tube 14 are firmly fastened together by relatively large fastening force. Accordingly, even if the connecting portion 44 of the ink supply tube 14, which is formed of a relatively soft material such as elastomer, is deformed due to creep or by external force, the ring 60 and the wedge-like portion 62 prevent the seal performance between the ink supply tube 14 and the connecting member 13 from being lowered.

(3) In the first embodiment, the engagement holes 68 are defined in the ring 60 and the projection 74 is formed in the wedge-like portion 62. The projection 74 is fitted in the corresponding engagement hole 68 with the consequence that movement of the wedge-like portion 62 in the longitudinal direction of the ink supply tube 14 is restricted. This suppresses the decrease of the fastening force acting on the joint portion 56, which is caused by the movement of the wedge-like portion 62, and prevents the seal performance between the ink supply tube 14 and the connecting member 13 from being decreased. Further, the tapered portion of the wedge-like portion 62 facilitates fitting of the wedge-like portion 62 into the space between the ring 60 and the joint portion 56.

(4) In the first embodiment, a pair of left and right stoppers 76 project from the end of the wedge-like portion 62 corresponding to the ink supply tube 14 (opposite to the tapered portion of the wedge-like portion 62). The stoppers 76 are held in contact with the end of the ring 60 corresponding to the ink supply tube 14. Such contact prevents the wedge-like portion 62 from moving toward the connecting member 13. This suppresses the decrease of the fastening force acting on the joint portion 56 caused by the movement of the wedge-like portion 62, thus maintaining the seal performance between the ink supply tube 14 and the connecting member 13.

(5) In the first embodiment, the engagement projections 31 projecting from the connecting portion 17 of the connecting member 13 are fitted in the openings 50 defined in the ink supply tube 14. This facilitates positioning between the connecting member 13 and the ink supply tube 14 when joining the two components together.

(6) In the first embodiment, each of the port defining portions 33 projects perpendicular to the corresponding ink passage 25 serving as a passage of the connecting member 13. Each of the openings 52 extends perpendicular to the corresponding ink supply line 49 serving as a liquid supply line of the ink supply tube 14. With the port defining portions 33 fitted in the corresponding openings 52, the securing member 58 firmly fastens the connecting member 13 and the ink supply tube 14 together. The securing member 58 thus produces the fastening force in the direction in which the port defining portions 33 are inserted into the openings 52. This makes it difficult for each of the port defining portions 33 and the associated opening 52 to separate from each other.

A second embodiment of the present invention will hereafter be described with reference to FIGS. 8 to 10. The second embodiment is different in that a restricting portion 82 functioning as an extended portion is provided in the wedge-like portion 62, which has been explained for the first embodiment. In the following description, same or like reference numerals are given to parts of the second embodiment that are the same or like corresponding parts of the first embodiment and detailed description thereof is omitted.

Figure 8:
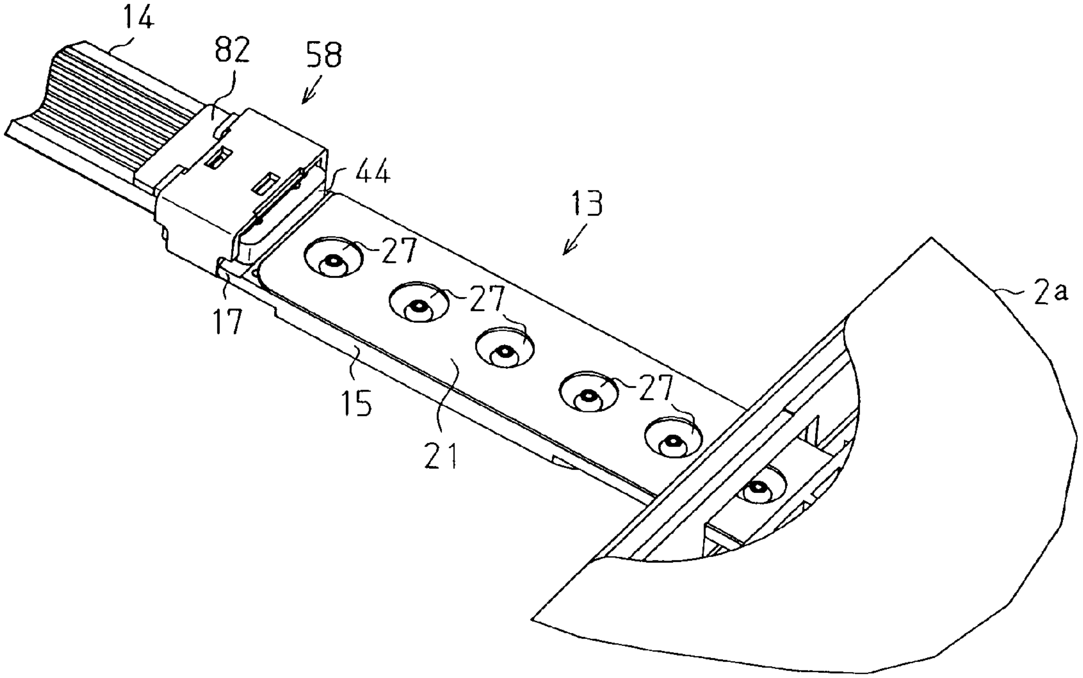
FIG. 8 is a perspective view for explaining the structure of a securing member according to a second embodiment of the present invention.
Figure 9:
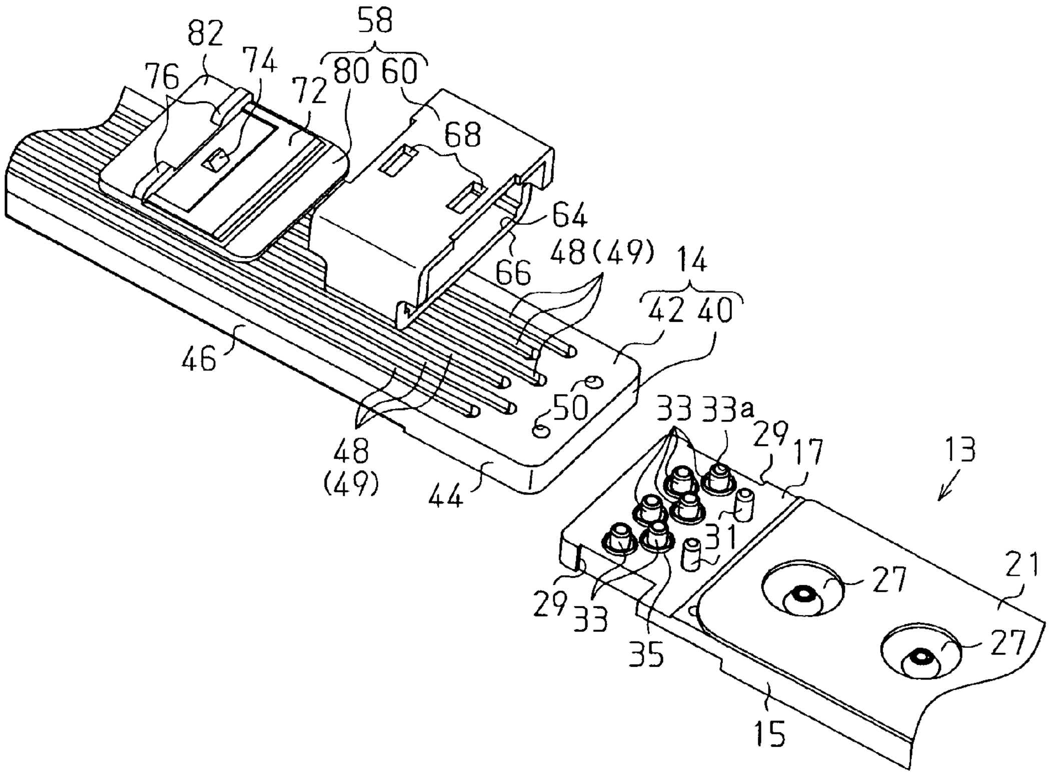
FIG. 9 is an exploded perspective view for explaining the structure of the securing member of FIG. 8.
Figure 10:
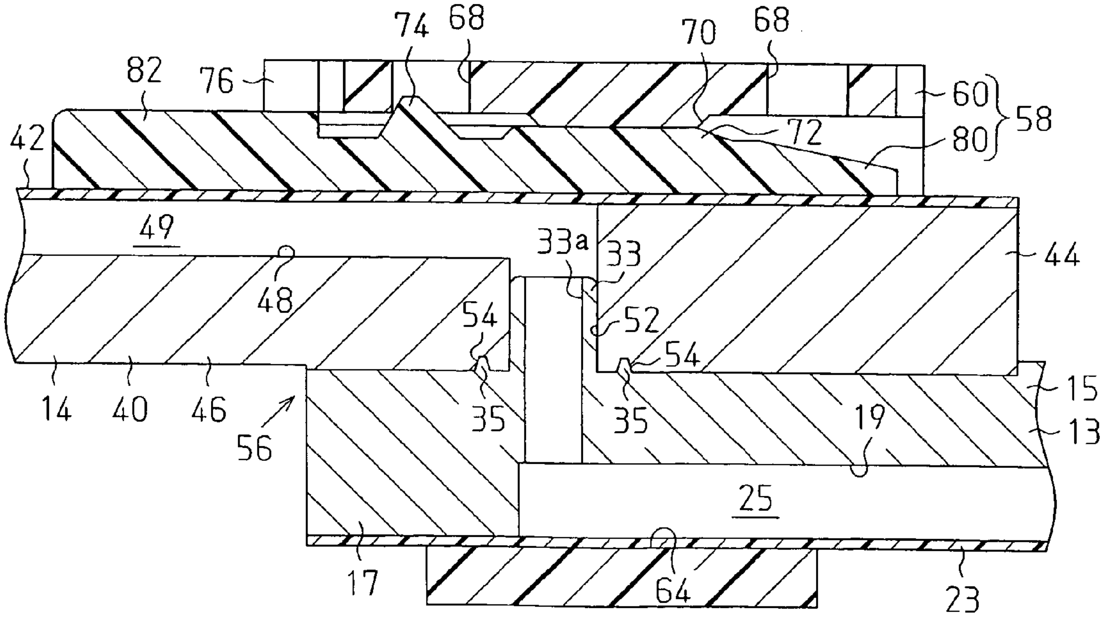
FIG. 10 is a cross-sectional view for explaining the structure of the securing member of FIG. 8.

As shown in FIGS. 8 to 10, a wedge-like portion 80 of the second embodiment has the restricting portion 82 having a plate-like shape. The restricting portion 82 extends in the opposite direction to the tapered portion with respect to the longitudinal direction of the wedge-like portion 80. The restricting portion 82 projects along the ink supply tube 14 to the exterior of the ring 60. The second embodiment is characterized by the restricting portion 82. The projection 72, the projection 74, and the stoppers 76 are identical with those of the first embodiment. The width of the restricting portion 82 is equal to that of the wedge-like portion 80. The projection amount of the restricting portion 82 from the wedge-like portion 80 to the ink supply tube 14 (to the side opposite to the tapered portion) is not less than the thickness of the elastic member 40 of the ink supply tube 14.

Like the first embodiment, the connecting member 13 and the ink supply tube 14 are joined together, and the ring 60 is placed around the connecting member 13 and the ink supply tube 14. The wedge-like portion 80 is then inserted (fitted) into the ring 60. In this state, the restricting portion 82 is held in a state projecting along the upper surface of the ink supply tube 14.

In this manner, if force acts on the ink supply tube 14 in the direction perpendicular to the longitudinal direction of the ink supply tube 14 to bend the ink supply tube 14 toward the film member 42, the affected portion of the ink supply tube 14 is held in place by the restricting portion 82. Therefore, even when the ink supply tube 14 is slightly bent, such bending is restricted before reaching the extent at which the bent portion extends perpendicular to the connecting member 13. The ink supply tube 14 is thus prevented from displacing upward form the connecting member 13 at the joint portion 56, and the seal performance is maintained.

Further, if the ink supply tube 14 is urged to be bent by a relatively large amount to the extent at which the surface of the ink supply tube 14 corresponding to the film member 42 is sandwiched by the bent portion of the ink supply tube 14, such bending is restricted by the restricting portion 82. This prevents the film member 42 from being bent and ruptured, thus preventing the groove portions 48 of the elastic member 40 from being exposed and thus causing ink leakage.

The second embodiment has the following advantages in addition to those of the first embodiment.

(1) In the second embodiment, the restricting portion 82 is provided at the end of the wedge-like portion 80 corresponding to the ink supply tube 14 (opposite to the tapered portion). The restricting portion 82 is projected in a plate-like shape by an amount not less than the thickness of the elastic member 40 of the ink supply tube 14. Thus, if force acts on the ink supply tube 14 in the direction perpendicular to the longitudinal direction of the ink supply tube 14 to bend the ink supply tube 14 toward the film member 42, the restricting portion 82 restricts such bending. The ink supply tube 14 is thus prevented from moving upward, and the seal performance is maintained. Further, if the ink supply tube 14 is urged to be bent by a large amount to the extent at which the surface corresponding to the film member 42 is sandwiched by the bent portion, such bending is restricted by the restricting portion 82. The film member 42 is thus prevented from being ruptured due to the aforementioned bending, and the groove portions 48 of the elastic member 40 are prevented from being exposed and thus causing ink leakage.

Figure 11:
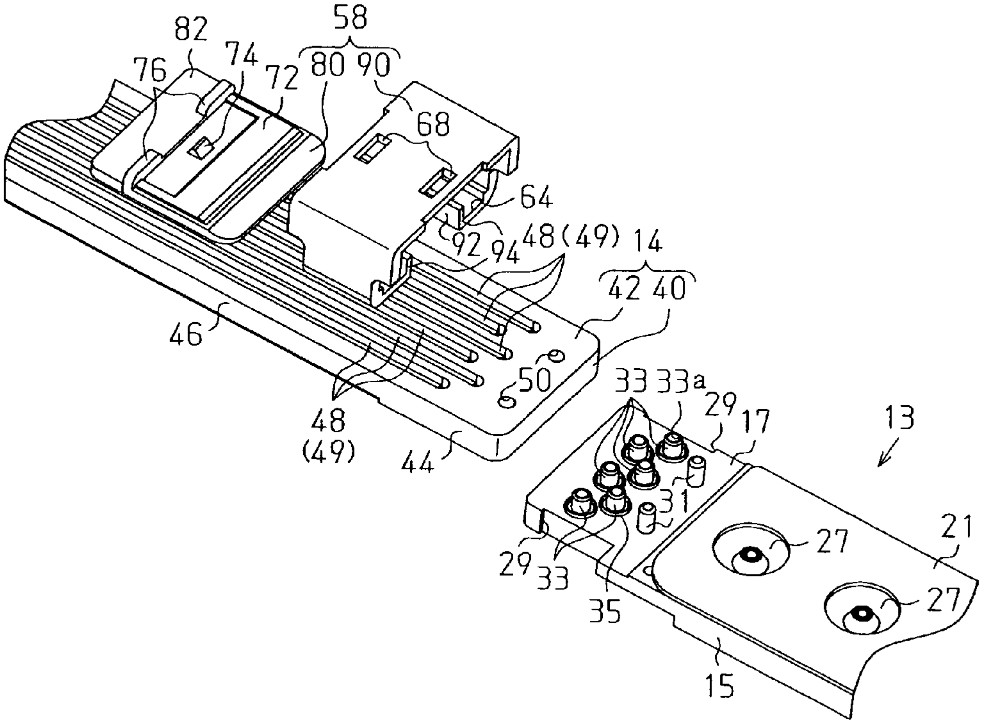
FIG. 11 is an exploded perspective view for explaining the structure of a securing member according to a third embodiment of the present invention.
Figure 12:
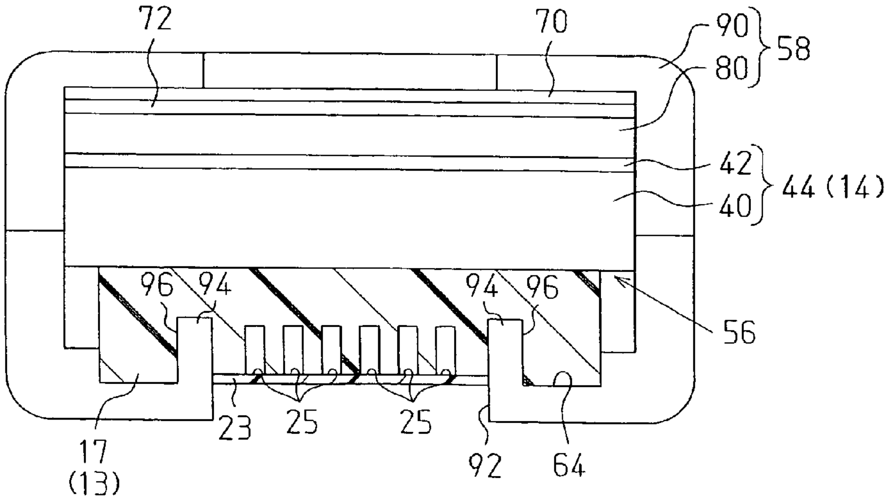
FIG. 12 is a partial cross-sectional view for explaining the structure of the securing member of FIG. 11.

A third embodiment of the present invention will hereafter be described with reference to FIGS. 11 and 12. The third embodiment is different from the first and second embodiments in the shape of the ring 60, which has been explained for the first and second embodiments, and, accordingly, the shape of the connecting member 13. In the following description, same or like reference numerals are given to parts of the third embodiment that are the same or like corresponding parts of the first and second embodiments and detailed description thereof is omitted As shown in FIGS. 11 and 12, a mouth portion 92 is defined in the lower surface of the ring 90 at a position at which a weld line is likely to appear when injection molding is performed. The ring 90 thus has a C-shaped cross-sectional shape. A pair of left and right engagement projections 94 project from the opposing ends of the mouth portion 92. Each of the engagement projections 94 is shaped in a bent manner and the length of each engagement projection 94 is equal to the length of the ring 90 as measured in the longitudinal direction of the ink supply tube 14.

Further, referring to FIG. 12, a pair of, left and right engagement recesses 96 are defined in the connecting portion 17 of the connecting member 13 at the positions corresponding to the engagement projections 94, which are formed as bent from the lower surface of the ring 90. The longitudinal dimension of each of the engagement recesses 96 is equal to that of the ring 90.

Like the first or second embodiment, the connecting member 13 and the ink supply tube 14 are joined together and the ring 90 is placed around the outer circumference of the joint portion 56. Since the ring 90 has the mouth portion 92, the joint portion 56 is not fixed at the position corresponding to the mouth portion 92. However, by fitting the engagement projections 94 of the ring 90 in the engagement recesses 96 of the connecting member 13, the outer circumferences of the connecting member 13 and the ink supply tube 14 are firmly fastened together. Accordingly, since production of a weld line caused by the injection molding is avoided, the fastening force applied to the ring 90 is prevented from being lowered by rupture of the ring 90, which is caused by the weakened strength of the ring 90 due to the weld line production after the joint portion 56 is fastened by the ring 90.

The third embodiment has the following advantages in addition to those of the first and second embodiments.

(1) In the third embodiment, the mouth portion 92 is defined in the lower surface of the ring 90 with the consequence that the ring 90 has a C-shaped cross-sectional shape. Also, the two, left and right engagement projections 94 project from the opposing ends of the mouth portion 92 of the ring 90. Each engagement projection 94 is shaped in a bent manner and has a length equal to the length of the ring 90 as measured in the longitudinal direction of the ink supply tube 14. Each of the engagement projections 94 is fitted in the corresponding one of the two, left and right engagement recesses 96, which are defined in the connecting portion 17 of the connecting member 13. The ring 90 is thus allowed to firmly fasten the outer circumference of the joint portion 56 regardless of the mouth portion 92. Also, since production of a weld line caused by the injection molding is avoided, the fastening force applied to the ring 90 is prevented from being lowered by rupture of the ring 90, which is caused by the weakened strength of the ring 90 due to the weld line production after the joint portion 56 is fastened by the ring 90.

A fourth embodiment of the present invention will hereafter be described with reference to FIGS. 13 and 14. The fourth embodiment is different in that the securing member 58, which has been explained for the first embodiment, further includes a damper member 98. In the following description, same or like reference numerals are given to parts of the fourth embodiment that are the same or like corresponding parts of the first embodiment and detailed description thereof is omitted.

Figure 13:
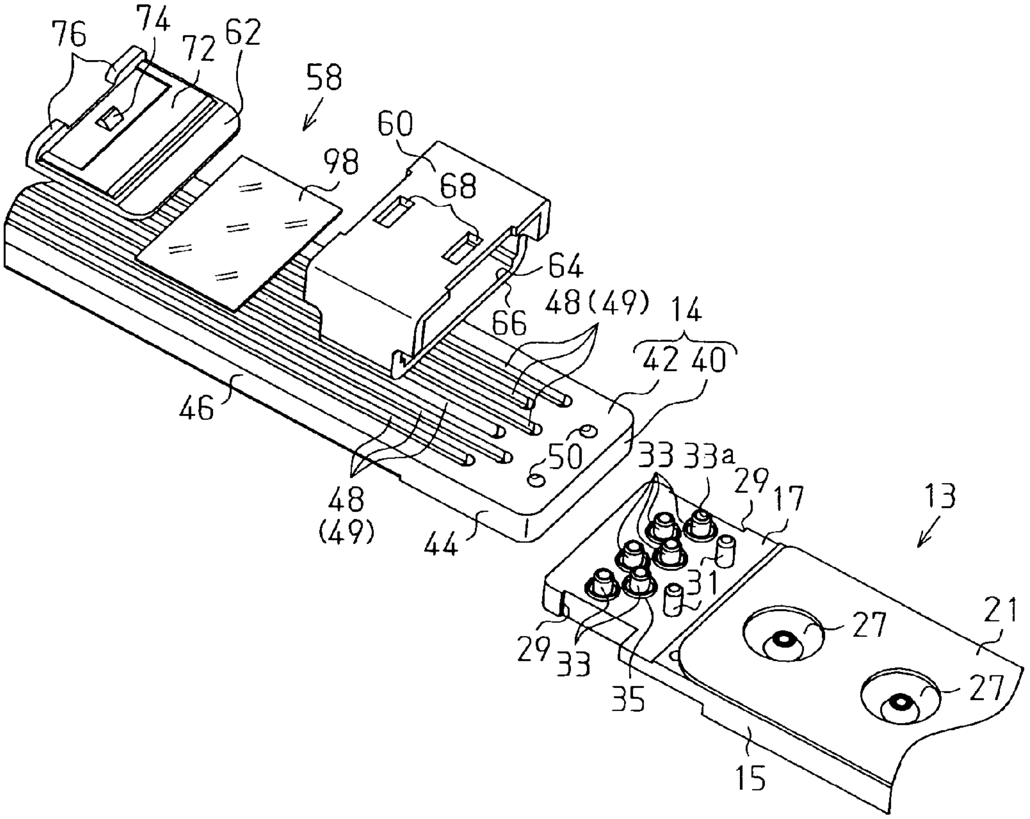
FIG. 13 is an exploded perspective view for explaining the structure of a securing member according to a fourth embodiment of the present invention.
Figure 14:
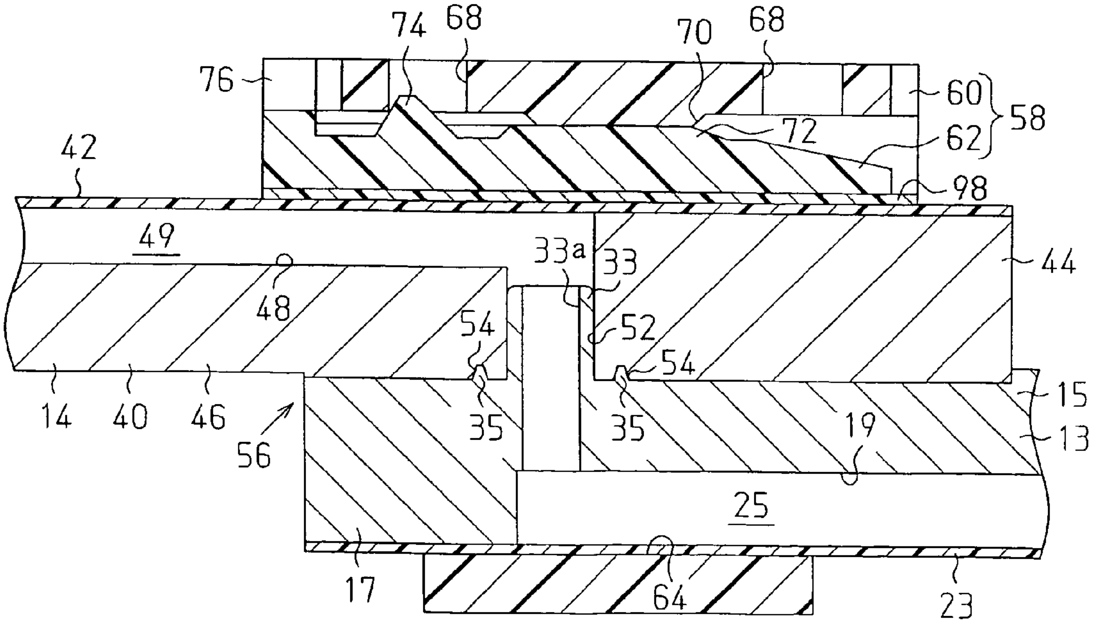
FIG. 14 is a cross-sectional view for explaining the structure of the securing member of FIG. 13.

As shown in FIGS. 13 and 14, the securing member 58 of the fourth embodiment has the damper member 98. The damper member 98 is formed as a square plate-like sheet and the width of the damper member 98 is equal to the width of the inner wall surface of the ring 60. The length of the damper member 98 is equal to the length of the longitudinal side of the upper surface of the ring 60, referring to FIG. 14. The damper member 98 is formed of, for example, synthetic resin. Since the damper member 98 is formed as a sheet, the thickness of the damper member 98 does not hamper the installation of the securing member.

When installing the securing member 58, the connecting member 13 and the ink supply tube 14 are joined together, like the first embodiment, and the ring 60 is placed around the joined components. The damper member 98 is then placed in the space encompassed by the ring 60 and on the upper surface of the joint portion 56 (the side corresponding to the film member 42 of the ink supply tube 14). In other words, the damper member 98 is arranged in the connecting portion 44 as one of the connecting portions 17, 44, each of which forms a part of the associated one of the connecting member 13 and the ink supply tube 14 configuring the joint portion 56. The wedge-like portion 62 is then inserted into the space between the ring 60 and the ink supply tube 14 (the damper member 98). At this stage, the wedge-like portion 62 is allowed to smoothly slide on the damper member 98. That is, the synthetic resin forming the damper member 98 lowers the friction produced by the damper member 98, as compared to the friction caused by the film member 42. This enables the smooth insertion of the wedge-like portion 62. Accordingly, in such insertion, the force acting to separate the connecting member 13 and the ink supply tube 14 from each other is efficiently released from the joint portion 56 toward the ink supply tube 14. The seal performance of the joint portion 56 is prevented from lowering.

The fourth embodiment has the following advantages in addition to those of the first embodiment.

(1) In the fourth embodiment, the securing member 58 includes the damper member 98, or the square plate-like sheet. The damper member 98 is placed in the space encompassed by the ring 60 and on the upper surface of the joint portion 56 (the side corresponding to the film member 42 of the ink supply tube 14), when installing the securing member 58. The force acting on the joint portion 56 to separate the connecting member 13 and the ink supply tube 14 from each other is efficiently released from the joint portion 56 toward the ink supply tube 14. This prevents the connecting member 13 and the ink supply tube 14 from separating from each other when the wedge-like portion 62 is inserted into the space between the ring 60 and the joint portion 56. Lowering of the seal performance of the joint portion 56 is thus avoided. Further, since the friction produced by the damper member 98 is lower than the friction caused by the film member 42 of the ink supply tube 14, insertion of the wedge-like portion 62 is facilitated. Also, since direct contact between the wedge-like portion 62 and the film member 42 of the ink supply tube 14 does not occur, the film member 42 is prevented from being damaged and thus causing ink leakage.

A fifth embodiment of the present invention will hereafter be described with reference to FIGS. 15 and 16. The fifth embodiment is different in that a port defining portion 34 located closest to the viewer of FIG. 15 of the port defining portions 33, which have been explained for the first to third embodiments, is formed longer than the remaining port defining portions 33. In the following description, same or like reference numerals are given to parts of the fifth embodiment that are the same or like corresponding parts of the first to third embodiments and detailed description thereof is omitted.

Figure 15:
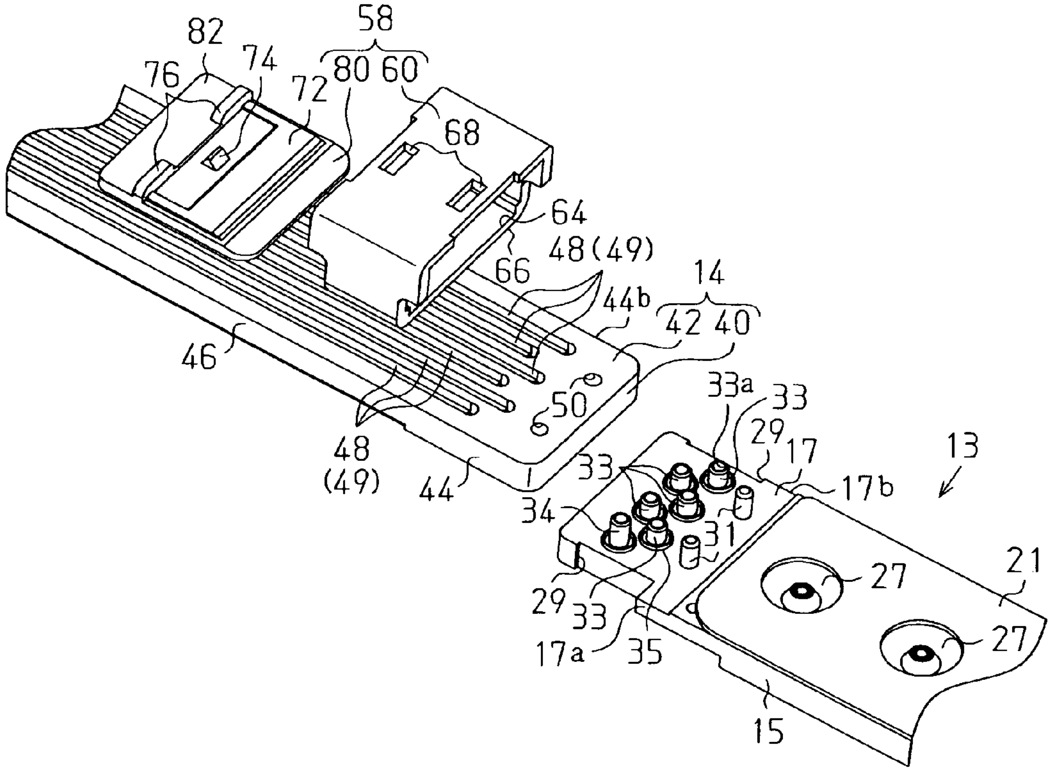
FIG. 15 is an exploded perspective view for explaining the structure of a securing member according to a fifth embodiment of the present invention.

As shown in FIG. 15, the port defining portions 33 are formed in the connecting portion 17 as arranged at alternate positions as viewed along the longitudinal direction of the connecting member 13, or as aligned in two lines extending in the lateral direction of the connecting member 13. Further, the line of the port defining portions 33 closer to the ink supply tube 14 as viewed in the drawing is located closer to the first side surface 17*a* of the connecting portion 17, which is located closer to the viewer of FIG. 15, as compared to the line of the port defining portions 33 closer to the engagement projections 31.

In the fifth embodiment, regarding the port defining portions 33 formed in the connecting portion 17, the port defining portion 34 closest to the first side surface 17*a* of the connecting portion 17, which is located closer to the viewer of FIG. 15, of the line of the port defining portions 33 closer to the ink supply tube 14 as viewed in the drawing is formed slightly longer than the remaining port defining portions 33. Further, the port defining portion 34 is located closer to the end of the connecting member 13 in a direction perpendicular to the extending direction of each ink passage 25. Although the port defining portion 34 closest to the first side surface 17*a* is formed longer than the remaining port defining portions in the fifth embodiment, any one of the port defining portions 33 closer to the first side surface 17*a* than the lateral middle of the connecting portion 17 may be formed longer. The port defining portion 34 is given a different reference numeral from the remaining port defining portions 33 for the description purposes.

Figure 16:
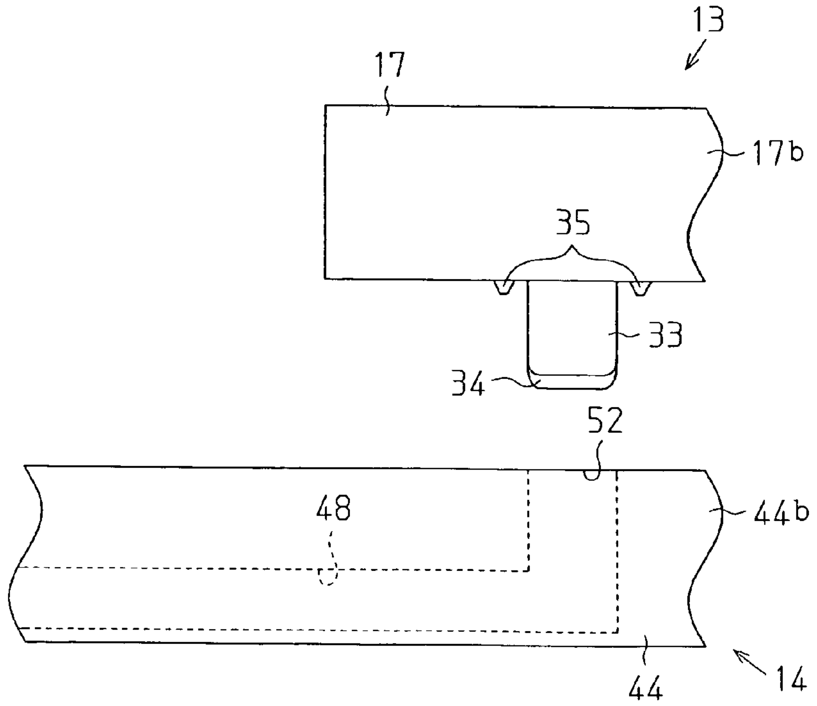
FIG. 16 is a view for explaining connection between the connecting member of FIG. 15 and the ink supply tube.

For joining the connecting member 13 and the ink supply tube 14 together, the second side surface 17*b* of the connecting portion 17 (the connecting member 13) opposed to the first side surface 17*a* is faced upward as shown in FIG. 16. Regarding the connecting portion 44 (the ink supply tube 14), the second side surface 44*b* of the connecting portion 44 is faced upward similarly, in such a manner as to oppose the connecting portion 17. The connecting portions 17, 44 are then overlapped with each other and joined together.

When joining the connecting member 13 and the ink supply tube 14 together, the port defining portion 33 closest to the operator is visible to the operator. In contrast, since the port defining portions 33 spaced from the operator have equal lengths and are aligned along the lines, the port defining portions 33 are invisible to the operator, as located behind the port defining portion 33 closest to the operator.

However, referring to FIG. 16, the port defining portion 34 most spaced from the operator when joining the connecting member 13 and the ink supply tube 14 together is longer than the remaining port defining portions 33. Therefore, the port defining portion 34 is prevented from being made invisible by the port defining portions 33, thus maintaining the visibility of the port defining portion 34 to the operator. Thus, for joining the connecting member 13 and the ink supply tube 14 together, the port defining portion 34 is first inserted into the corresponding opening 52 of the ink supply tube 14. Then, starting from the port defining portion 33 closest to the port defining portion 34, the port defining portions 33 are inserted into the corresponding openings 52 of the ink supply tube 14, successively. In this manner, the port defining portion 34, which is located at the most invisible position, is reliably fitted in the corresponding opening 52 of the ink supply tube 14 (the connecting portion 44) when the connecting member 13 is joined with the ink supply tube 14. This prevents lowering of the seal performance between the connecting member 13 and the ink supply tube 14, which might be caused by incomplete fitting of the port defining portion 34 of the connecting member 13 in the opening 52 of the ink supply tube 14.

The fifth embodiment has the following advantages in addition to those of the first to third embodiments.

(1) In the fifth embodiment, regarding the port defining portions projecting from the connecting portion 17 as aligned along the lines, the port defining portion 34 most spaced from the operator when joining the connecting member 13 and the ink supply tube 14 together is formed longer than the remaining port defining portions 33. This allows the operator to view the port defining portion 34, which is longer, when joining the connecting member 13 with the ink supply tube 14. Accordingly, the port defining portion 34, which is located at the most invisible position, is reliably fitted in the corresponding opening 52 of the ink supply tube 14 (the connecting portion 44) when the connecting member 13 is joined with the ink supply tube 14. The seal performance between the connecting member 13 and the ink supply tube 14 is thus improved.

A sixth embodiment of the present invention will hereafter be described with reference to FIG. 17. The sixth embodiment is different in that one of the two engagement projections 31, which have been explained for the first to third embodiments and the fifth embodiment, is located in the vicinity of a port defining portion 34*k*, which is located closest to the viewer of FIG. 17, of the port defining portions 33. In the following description, same or like reference numerals are given to parts of the sixth embodiment that are the same or like corresponding parts of the first to third embodiments and the fifth embodiment and detailed description thereof is omitted.

Figure 17:
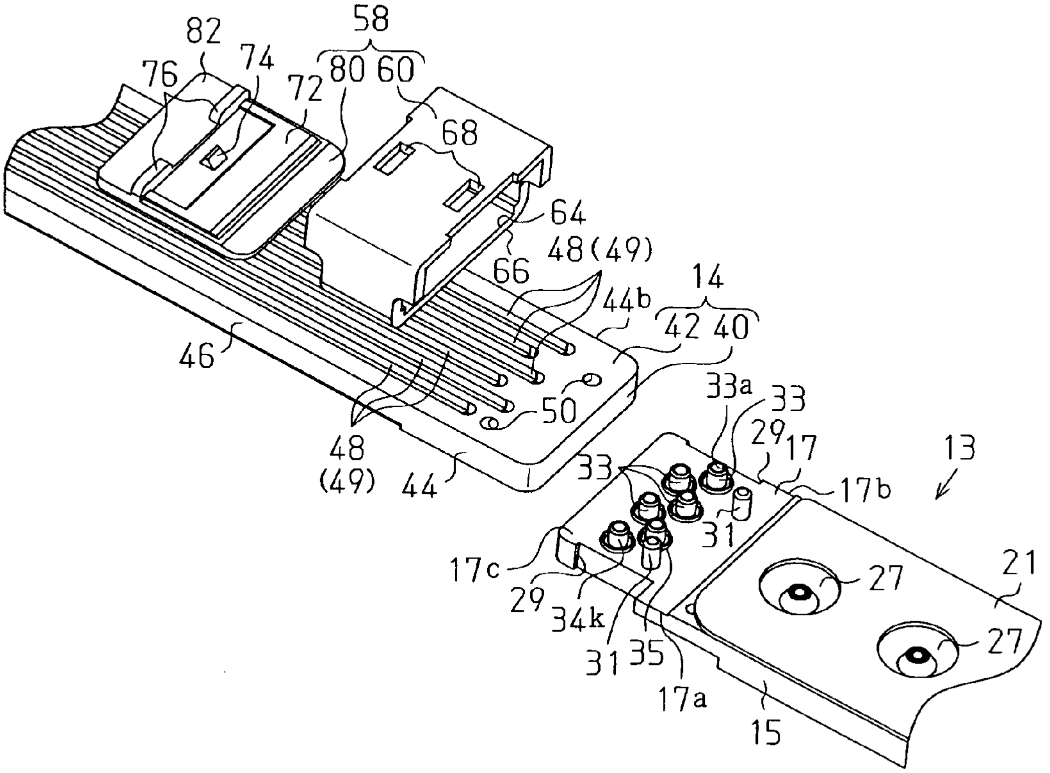
FIG. 17 is an exploded perspective view for explaining the structure of a securing member according to a sixth embodiment of the present invention.

As viewed in FIG. 17, in the sixth embodiment, the port defining portions 33 are formed to have equal lengths. Further, in this embodiment, one of two, left and right engagement projections 31 is arranged in the vicinity of the port defining portion 34*k* (given a different reference numeral from the remaining port defining portions 33 for the description purposes), which is most spaced from the operator when joining the connecting member 13 with the ink supply tube 14. The position of the associated engagement hole 50 is correspondingly altered, so that the engagement projection 31 can be fitted in the engagement hole 50. In the sixth embodiment, the engagement projection 31 is located in the vicinity of the port defining portion 34*k*, which is most spaced from the operator when joining the connecting member 13 with the ink supply tube 14. However, such location may be changed to any suitable position as long as the engagement projection 31 is formed in the vicinity of any one of the port defining portions 33 that are spaced from the operator with respect to the lateral middle of the connecting member 13 when the connecting member 13 is joined with the ink supply tube 14.

When joining the connecting member 13 with the ink supply tube 14, the second side surface 17*b* of the connecting portion 17 (the connecting member 13) is faced upward, like the fifth embodiment. Regarding the connecting portion 44 (the ink supply tube 14), the second side surface 44*b* of the connecting portion 44 is faced upward similarly, in such a manner as to oppose the connecting portion 17. The connecting portions 17, 44 are then overlapped with each other and joined together.

When the connecting member 13 and the ink supply tube 14 are joined together, the port defining portion 33 closest to the operator is visible to the operator. In contrast, the port defining portions 33, 34*k* spaced from the operator have equal lengths and are aligned along the lines. The port defining portions 33, 34*k* are thus invisible from the operator, as located behind the port defining portion 33 closest to the operator.

However, in the sixth embodiment, the engagement projection 31 is arranged in the vicinity of the port defining portion 34*k*, which is most spaced from the operator when joining the connecting member 13 and the ink supply tube 14 together. Thus, by using the engagement projection 31 as a reference mark, the port defining portion 34*k* may be connected to the ink supply tube 14. That is, for joining the connecting member 13 with the ink supply tube 14, the port defining portion 34*k* is first positioned and connected to the ink supply tube 14 by using the engagement projection 31 as the reference mark. Then, starting from the port defining portion 33 closest to the port defining portion 34*k*, the port defining portions 33 are connected to the ink supply tube 14 at corresponding positions, successively. Accordingly, the port defining portion 34*k*, which is most invisible from the operator, is reliably connected to the ink supply tube 14 (the connecting portion 44) when the connecting member 13 is joined with the ink supply tube 14.

The sixth embodiment has the same advantages as those of the fifth embodiment.

The illustrated embodiments may be modified as follows.

In the fourth embodiment, the damper member 98 is formed as a plate-like sheet having a relatively small thickness. However, the thickness of the damper member 98 may be increased. In this case, the force acting on the joint portion 56 to separate the connecting member 13 and the ink supply tube 14 from each other is further effectively released from the joint portion 56 toward the ink supply tube 14. This further reliably prevents lowering of the seal performance of the joint portion 56, which is caused by separation between the connecting member 13 and the ink supply tube 14, when the wedge-like portion 62 is inserted into the space between the ring 60 and the joint portion 56.

In the fifth embodiment, the port defining portion 34, which is most spaced from the operator when joining the connecting member 13 and the ink supply tube 14 together, is formed longer than the remaining port defining portions 33. However, instead of the port defining portion 34, the engagement projection 31 spaced from the operator may be formed longer. In this manner, the fifth embodiment has the same advantages as those of the sixth embodiment.

In the fifth embodiment, the second side surface 17*b* of the connecting portion is faced upward when the connecting member 13 is joined with the ink supply tube 14. However, such joining may be performed with the first side surface 17*a* of the connecting portion faced upward. In this case, the length of the corresponding port defining portion 33 must be changed correspondingly.

Figure 18:
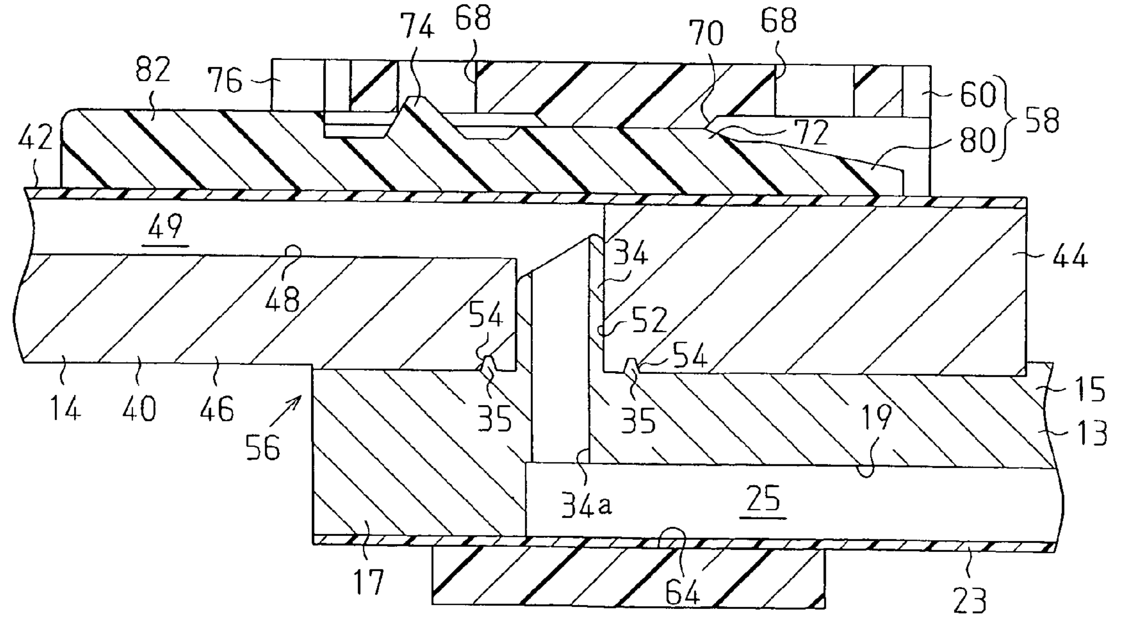
FIG. 18 is a cross-sectional view for explaining the structure of a securing member of another modification of the present invention.

In the fifth embodiment, the port defining portion 34, which is most spaced from the operator when joining the connecting member 13 and the ink supply tube 14 together, is formed longer than the remaining port defining portions 33. Further, as shown in FIG. 18, the port defining portion 34 may be formed in such a manner that the side of the port defining portion 34 opposed to the distal, tapered portion becomes relatively short, or, in other words, the port defining portion 34 may be shaped in a slanted manner. In this case, the outer wall of the port defining portion 34 does not block the corresponding ink supply line 49 defined in the ink supply tube 14. The port defining portion 34 is thus prevented from hampering the communication between a port 34*a* and the ink supply line 49.

In the fifth embodiment, the port defining portion 34, which is most spaced from the operator when joining the connecting member 13 and the ink supply tube 14 together, is formed longer than the remaining port defining portions 33. However, instead of increasing the length of the port defining portion 34, the lengths of the port defining portions 33, other than the port defining portion 34, may be decreased.

Figure 19:
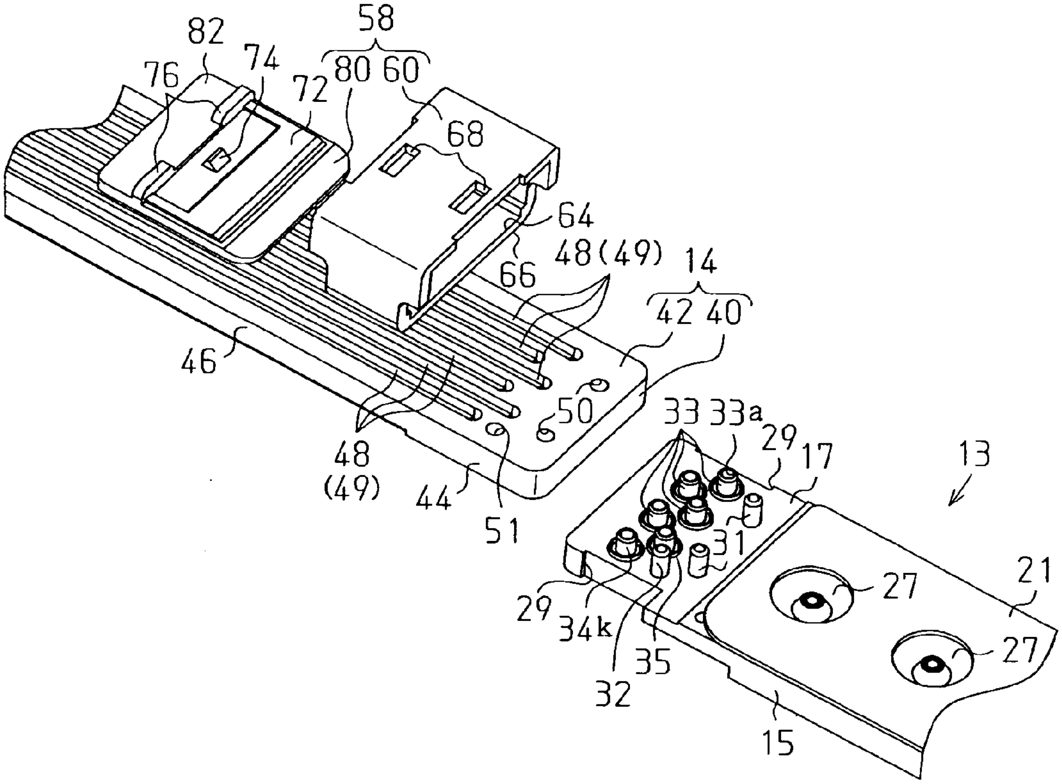
FIG. 19 is an exploded perspective view for explaining the structure of a securing member of another modification of the present invention.

In the sixth embodiment, one of the pair of left and right engagement projections 31 is arranged in the vicinity of the port defining portion 34*k*, which is most spaced from the operator when joining the connecting member 13 with the ink supply tube 14. The position of the associated engagement hole 50 is correspondingly altered, so that the engagement projection 31 can be fitted in the engagement hole 50. However, instead of changing the position of the engagement projection 31, an additional engagement projection 32 may be formed in the vicinity of the port defining portion 34*k* and an associated engagement hole 51 may be defined correspondingly, as shown in FIG. 19. In this manner, in addition to the advantage of the sixth embodiment, the force acting on the joint portion 56 to separate the connecting member 13 and the ink supply tube 14 from each other is released from the joint portion 56 to the projections 31, 32. This suppresses separation between the connecting member 13 and the ink supply tube 14, and thus preventing the seal performance of the joint portion 56 from being lowered, when the connecting member 13 is joined with the ink supply tube 14.

Further, the quantity of the engagement projection 32 is not restricted to one but may be increased. As the quantity of the engagement projections 32 is increased, the reliability for releasing the force acting on the joint portion 56 to separate the connecting member 13 and the ink supply tube 14 from each other from the joint portion 56 to the projections 31, 32 is further increased. The seal performance of the joint portion 56 is thus prevented from lowering.

For joining the connecting member 13 with the ink supply tube 14, the second side surface 17*b* of the connecting portion may be faced downward. In this case, the engagement projection 32 may be arranged in the vicinity of the port defining portion 33 spaced from the operator when joining the connecting member 13 with the ink supply tube 14. The same advantages as those described above are thus obtained.

In the sixth embodiment, the second side surface 17*b* of the connecting portion is faced upward when the connecting member 13 and the ink supply tube 14 are joined together. However, such joining may be performed with the first side surface 17*a* of the connecting portion faced upward. In this case, by arranging the engagement projection 31 in the vicinity of the port defining portion 33 spaced from the operator when joining the connecting member 13 with the ink supply tube 14, the same advantages as those described above are obtained.

Although the port defining portions 33, 34, 34*k* are aligned linearly in each of the fifth and sixth embodiments, the port defining portions 33, 34, 34*k* may be arranged in different manners other than the linear alignment.

Although the ring 60 (90) is formed of plastic such as polypropylene in each of the illustrated embodiments, the ring 60 (90) may be formed of metal. In this manner, production of a weld line caused by the injection molding can be avoided.

In each of the illustrated embodiments, the securing member 58 secures the joint portion 56 at which the connecting member 13 connected to the cartridge holder 2*a* and the ink supply tube 14 are joined together. However, the securing member may secure the joint portion at which the ink supply tube 14 is joined with the valve units 6. Further, the connecting member 13 may be connected to an ink reservoir (a liquid supply portion). The ink reservoir (the liquid supply portion) may be arranged in the exterior of the printer. Also, in any of these cases, the position of the connecting member 13 relative to the position of the elastic member 40 may be reversed. Alternatively, the connecting member 13 may be connected to any other suitable component, as long as liquid flows in the component.

Figure 20:
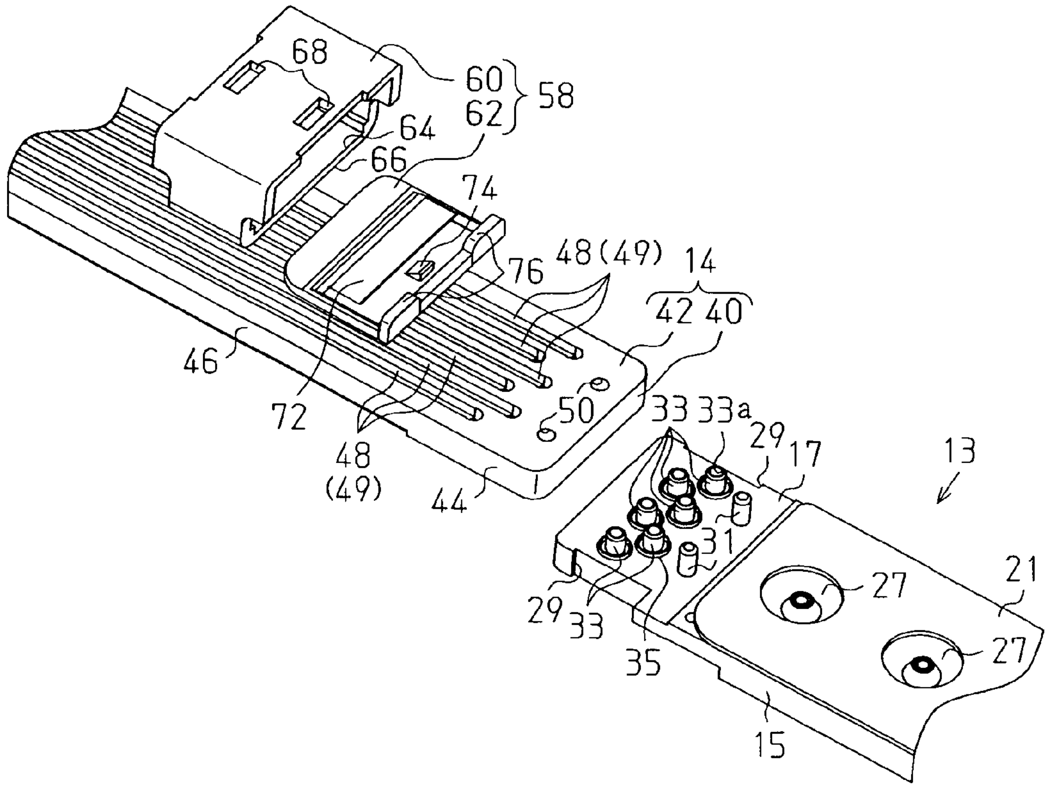
FIG. 20 is an exploded perspective view for explaining the structure of a securing member of another modification of the present invention.

In each of the illustrated embodiments, the securing member 58 is formed by the ring 60, 90 and the wedge-like portion 62, 80. The wedge-like portion 62, 80 is inserted from the side corresponding to the ink supply tube 14 into the small space defined above the ink supply tube 14 in the space encompassed by the ring 60, 90. However, as illustrated in FIG. 20, such insertion may be performed from the side corresponding to the connecting member 13. That is, the wedge-like portion 62, 80 is moved from the connecting member 13 toward the ink supply tube 14 when inserted into the space between the ring 60, 90 and the joint portion 56. Accordingly, the engagement projections 31 absorb the force acting on the joint portion 56 in a direction perpendicular to the longitudinal direction of the ink supply tube 14 during insertion of the wedge-like portion 62, 80, thus reducing the force acting on the joint portion 56. This prevents the ink supply tube 14 from being raised when the wedge-like portion 62 is inserted, and the seal performance of the joint portion 56 is maintained. Alternatively, the wedge-like portion 62, 80 may be inserted into the small space defined between the ring 60, 90 and a lower portion of the connecting member 13. In this case, the damper member 98 of the fourth embodiment is arranged between the connecting member 13 and the wedge-like portion 62, 80.

Figure 21:
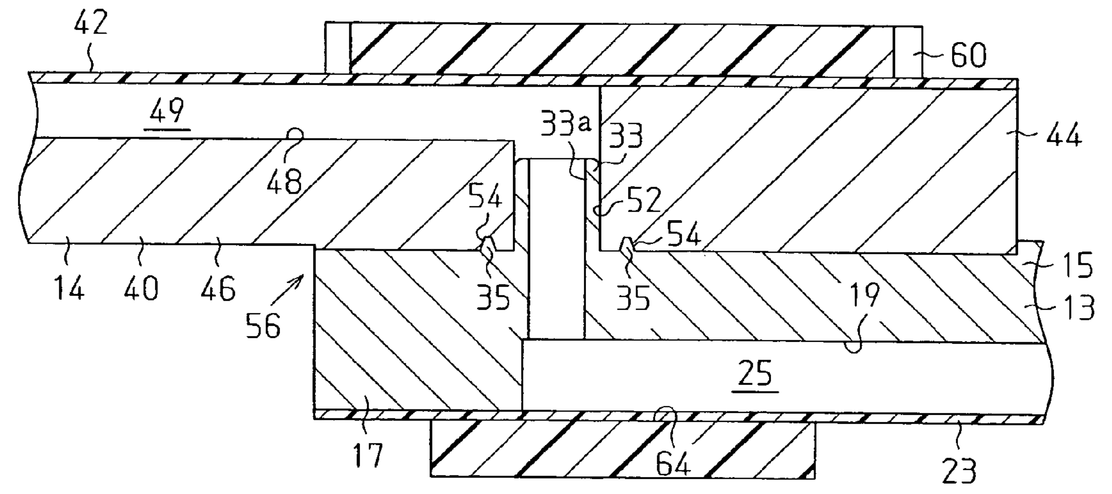
FIG. 21 is a cross-sectional view for explaining the structure of a securing member of another modification of the present invention.

Although the wedge-like portion 62, 80 is employed in each of the illustrated embodiments, the wedge-like portion 62, 80 may be omitted as illustrated in FIG. 21. In this case, the height of the ring 60 is smaller than that of, for example, the first embodiment. The ring 60 is sized in such a manner that space is barely defined between the joint portion 56 and the ring 60 when the joint portion 56, which includes the connecting member 13 and the ink supply tube 14 that are joined together, is engaged with the ring 60. Further, since this structure does not include the wedge-like portion 62, 80, it is not necessary to provide the engagement hole 68 or the projection 70. The outer circumference of the joint portion 56 is thus fastened by the single component, the ring 60. This shortens assembly time.

Figure 22:
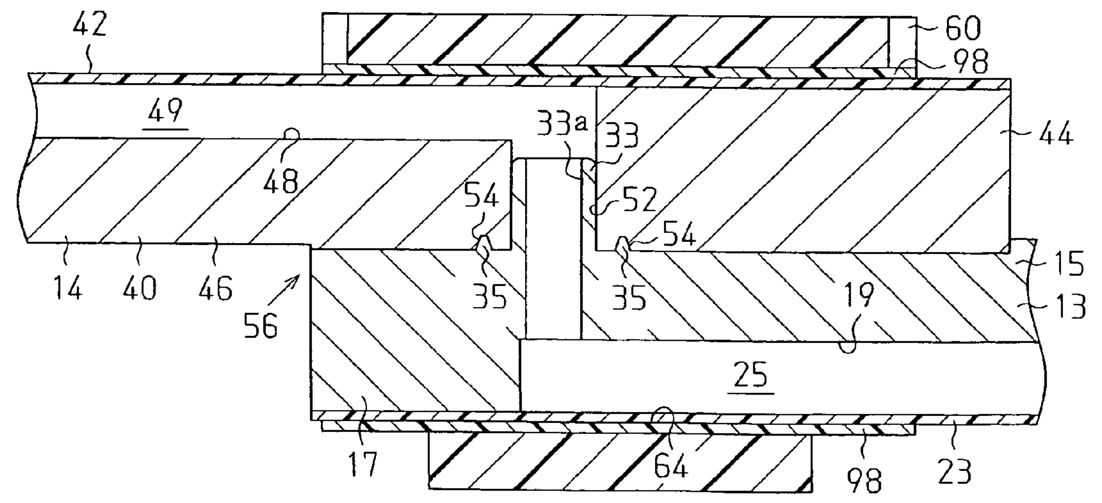
FIG. 22 is a cross-sectional view for explaining the structure of a securing member of another modification of the present invention.

As shown in FIG. 22, the damper member 98 may be shaped identical to the ring 60 (in an annular manner) for allowing the damper member 98 to protect both of the film members 23, 42. That is, the damper member 98 may be arranged in the space encompassed by the ring 60 and on the upper surface (corresponding to the film member 42 of the ink supply tube 14) and the lower surface (corresponding to the film member 23 of the connecting member 13) of the joint portion 56. This configuration efficiently releases the force acting on the joint portion 56 to separate the connecting member 13 and the ink supply tube 14 from each other, from the joint portion 56 toward the ink supply tube 14 and the connecting member 13. The damper member 98 having an annular shape may be used in combination with the wedge-like portion 62, 80.

In each of the illustrated embodiments, the ink supply tube 14 (the supply line defining body) may be connected to the rear side of the connecting portion 17 of the connecting member 13 (for example, the lower portion as viewed in FIG. 6). In this case, the port defining portions 33, 34, 34*k* may project downward.

Instead of the ink supply tube 14 of each of the illustrated embodiments, a component formed by connecting a plurality of elastic tubes in parallel may be connected to the connecting portion 17 of the connecting member 13. These tubes may be formed through extrusion molding. The tubes may be formed of elastomer and shaped as one body with the connecting member 13 through, for example, two color molding. Alternatively, the tubes may be connected to the connecting portion 17 of the connecting member 13 as the supply line defining body not in the form of a one-body component but as a simple bundle of tubes.

In the illustrated embodiments, the printer 1 is embodied as the liquid ejection device. However, a liquid ejection device ejecting a different type of liquid may be selected. Such device may be, for example, a liquid ejection device ejecting liquid such as electrode material or color material used in fabrication of liquid crystal displays or EL displays or surface emitting displays, a liquid ejection device ejecting biological organic matter used in fabrication of biochips, and a sample ejection device serving as a precision pipette.

Although the multiple embodiments have been described herein, it will be clear to those skilled in the art that the present invention may be embodied in different specific forms without departing from the spirit of the invention. The invention is not to be limited to the details given herein, but may be modified within the scope and equivalence of the appended claims.

The invention claimed is:

1. A structure for joining a passage defining member defining a plurality of passages with a supply line defining body defining a plurality of liquid supply lines, the supply line defining body being formed of an elastic member, the structure comprising:

a plurality of cylindrical port defining portions which project from the passage defining member, wherein each of the port defining portions includes a port communicating with a corresponding one of the passages;

the supply line defining body includes a plurality of openings each communicating with a corresponding one of the liquid supply lines;

the passage defining member is joined with the supply line defining body by fitting each of the port defining portions into an associated one of the openings, thereby allowing the passages to communicate with the liquid supply lines;

each of the port defining portions extends perpendicularly to the direction in which each of the passages extends;

each of the openings is defined in a columnar shape and extends perpendicular to the direction in which each of the liquid supply lines extends; and a securing member which fastens the port defining portions with respect to the corresponding openings collectively, by applying fastening force to the passage defining member and the supply line defining body in the axial direction of each port defining portion, wherein two portions at which the passage defining member and the supply line defining body are joined together form a joint portion; and the securing member includes a securing frame arranged around the joint portion, wherein the securing member further includes a stopper member having a tapered portion inserted into the space between the securing frame and the joint portion so that the tapered portion is fitted to the securing frame and the joint portion to fasten together the securing frame and the joint portion.

2. The structure according to claim 1, wherein the securing member further includes a damper member provided on one of the portion of the passage defining member and the portion of the supply line defining body forming the joint portion; and the tapered portion is inserted into the space between the securing frame and the damper member.

3. The structure according to claim 1, wherein the stopper member includes an extended portion extended to the exterior of the securing frame in such a manner as to proceed along the supply line defining body.

4. The structure according to claim 3, wherein the length of the extended portion is not less than the thickness of the supply line defining body with respect to the direction in which each liquid supply line extends.

5. The structure according to 1, wherein the securing frame has a mouth portion defined in a portion of the circumference of the securing frame.

6. A structure for joining a passage member defining a plurality of passages with a supply line defining body defining a plurality of liquid supply lines, the supply line defining body being formed of an elastic member, the structure comprising:

a plurality of cylindrical port defining portions which project from the passage defining member, wherein each of the port defining portions includes a port communicating with a corresponding one of the passages;

the supply line defining body includes a plurality of openings each communicating with a corresponding one of the liquid supply lines;

the passage defining member is joined with the supply line defining body by fitting each of the port defining portions into an associated one of the openings, thereby allowing the passages to communicate with the liquid supply lines;

each of the port defining portions extends perpendicularly to the direction in which each of the passages extends;

each of the openings is defined in a columnar shape and extends perpendicular to the direction in which each of the liquid supply lines extends, and a securing member which fastens the port defining portions with respect to the corresponding openings collectively, by applying fastening force to the passage defining member and the supply line defining body in the axial direction of each port defining portion, wherein at least one of the passage defining member and the supply line defining body includes a plurality of grooves, and wherein a film member is secured to the passage defining member or the supply line defining body in such a manner as to cover the grooves, thereby defining the passages or the supply lines.

7. A structure for joining a passage defining member defining a plurality of passages with a supply line defining body defining a plurality of liquid supply lines, the supply line defining body being formed of an elastic member, the structure comprising:

a plurality of cylindrical port defining portions which project from the passage defining member, wherein each of the port defining portions includes a port communicating with a corresponding one of the passages;

the supply line defining body includes a plurality of openings each communicating with a corresponding one of the liquid supply lines;

the passage defining member is joined with the supply line defining body by fitting each of the port defining portions into an associated one of the openings, thereby allowing the passages to communicate with the liquid supply lines;

each of the port defining portions extends perpendicularly to the direction in which each of the passages extends;

each of the openings is defined in a columnar shape and extends perpendicular to the direction in which each of the liquid supply lines extends; and a securing member which fastens the port defining portions with respect to the corresponding openings collectively, by applying fastening force to the passage defining member and the supply line defining body in the axial direction of each port defining portion, wherein the passage defining member includes two or more engagement projections, each of the engagement projections being longer than each of the port defining portions, and wherein the supply line defining body includes two or more engagement holes into which the corresponding engagement projections are fitted.

* * * * *